United States Patent
Speks et al.

(10) Patent No.: US 10,244,505 B2
(45) Date of Patent: Mar. 26, 2019

(54) OPERATING A POOL OF MOBILITY NODES

(71) Applicant: Telefonaktiebolaget LM Ericsson (publ), Stockholm (SE)

(72) Inventors: Oliver Speks, Eschweiler (DE); Florin Alexandru Deaconu, Eschweiler (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/738,157

(22) PCT Filed: Jul. 20, 2015

(86) PCT No.: PCT/EP2015/066573
§ 371 (c)(1),
(2) Date: Dec. 20, 2017

(87) PCT Pub. No.: WO2017/012651
PCT Pub. Date: Jan. 26, 2017

(65) Prior Publication Data
US 2018/0192393 A1     Jul. 5, 2018

(51) Int. Cl.
*H04W 8/08* (2009.01)
*H04W 68/00* (2009.01)
(Continued)

(52) U.S. Cl.
CPC ........... *H04W 68/005* (2013.01); *H04W 8/08* (2013.01); *H04W 8/26* (2013.01); *H04W 68/00* (2013.01); *H04W 8/30* (2013.01)

(58) Field of Classification Search
CPC ..... H04W 68/005; H04W 68/00; H04W 8/08; H04W 8/26; H04W 8/30
(Continued)

(56) References Cited

U.S. PATENT DOCUMENTS 8,160,582 B2   4/2012 Han
2012/0196570 A1 * 8/2012 Lindholm ............... H04W 8/26
                                                        455/411
(Continued)

FOREIGN PATENT DOCUMENTS

EP   1991015 A1 *  4/2007   ............ H04W 68/00
EP   1991015 A1   11/2008
WO   WO 2013/104101 A1   7/2013

OTHER PUBLICATIONS

International Search Report and Written Opinion of the International Searching Authority, PCT/EP2015/066573, dated Jun. 20, 2016, 17 pages.

*Primary Examiner* — William Nealon
(74) *Attorney, Agent, or Firm* — Sage Patent Group

(57) ABSTRACT

A mobility node is configured to track a mobility of entities. A pool of mobility nodes serve a common section of a cellular network, wherein for each of the mobile entities a unique identifier is used to uniquely identify the corresponding mobile entity and a temporary identifier is used to identify the corresponding mobile entity in at least one section of the cellular network. A message is received for one of the mobile entities identifying the mobile entity by an unknown temporary identifier. An identification request is transmitted to a storage unit storing information allowing a unique identifier to be determined based on a temporary identifier, the identification request requesting the unique identifier based on the unknown temporary identifier. A response to the transmitted identification request is received including information allowing the unique identifier to be determined. A reaction message is transmitted taking into account the unique identifier.

16 Claims, 27 Drawing Sheets

(51) Int. Cl.
*H04W 8/26* (2009.01)
*H04W 8/30* (2009.01)

(58) Field of Classification Search
USPC ........................................... 455/458
See application file for complete search history.

(56) References Cited

U.S. PATENT DOCUMENTS

| | | | | |
|---|---|---|---|---|
| 2015/0017980 A1* | 1/2015 | Chu | ............ | H04W 24/04 |
| | | | | 455/433 |
| 2015/0094060 A1* | 4/2015 | Kouridakis | ........... | H04W 60/06 |
| | | | | 455/435.1 |

* cited by examiner

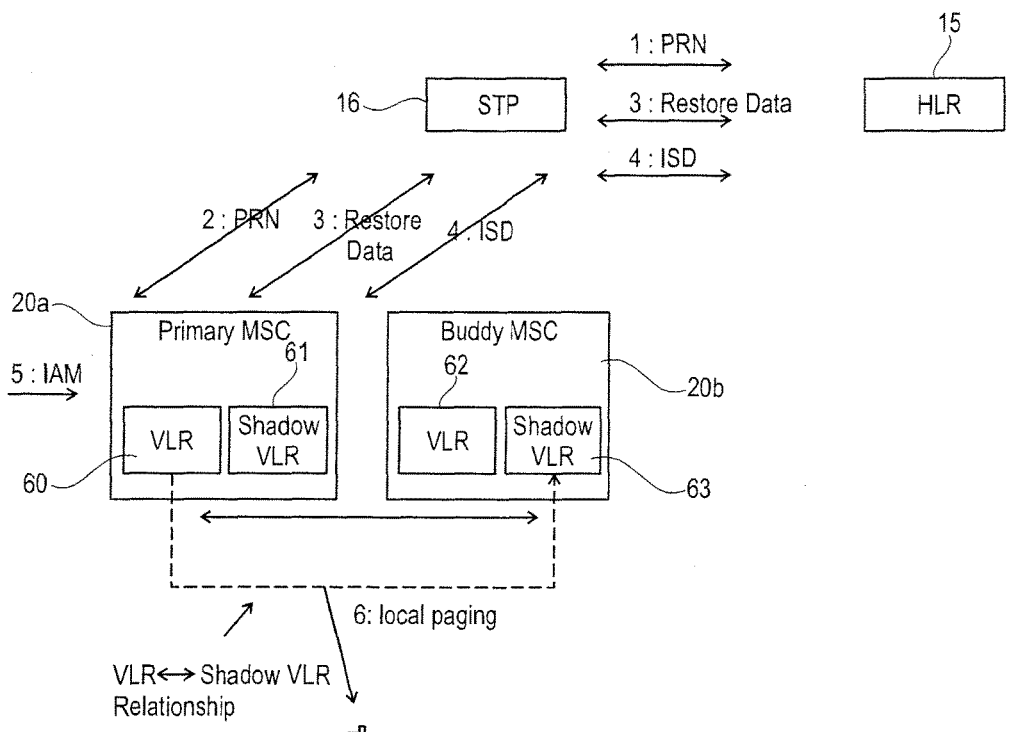
Fig. 5
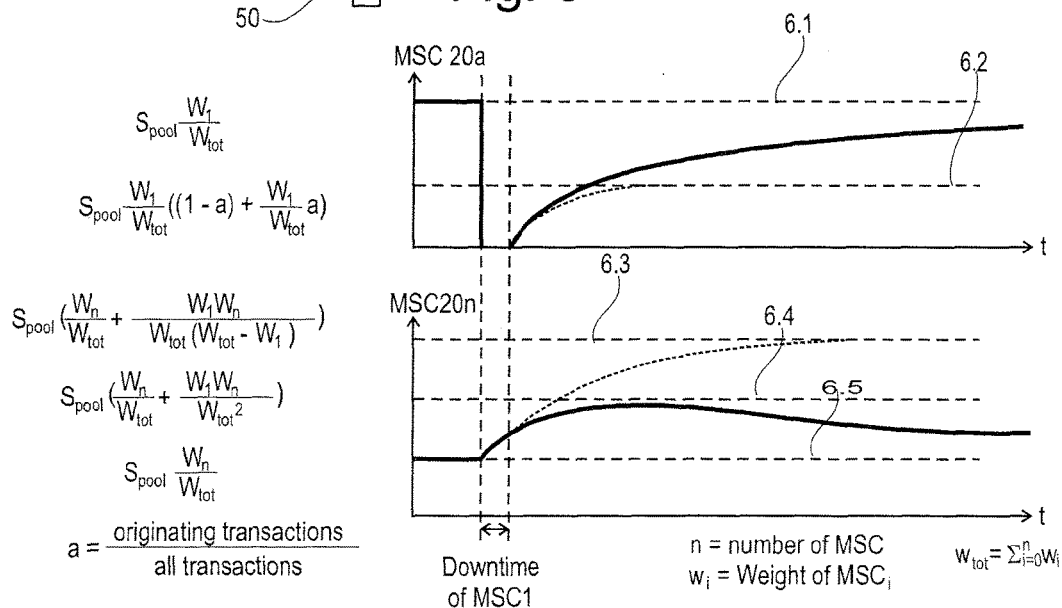
Fig. 6
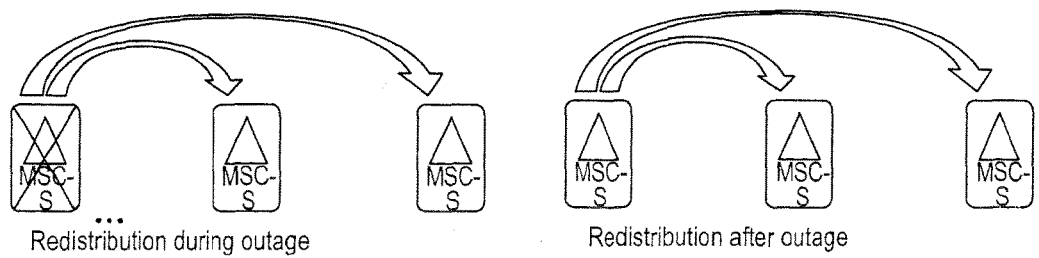

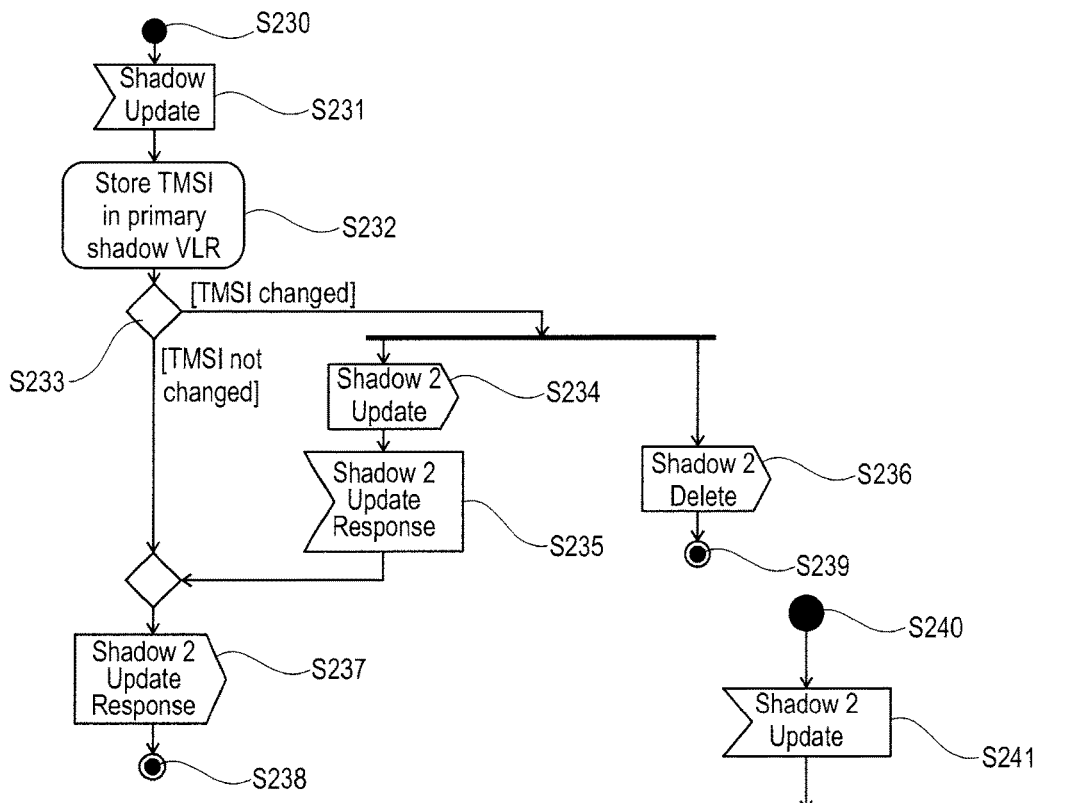
Fig. 20
Fig. 21
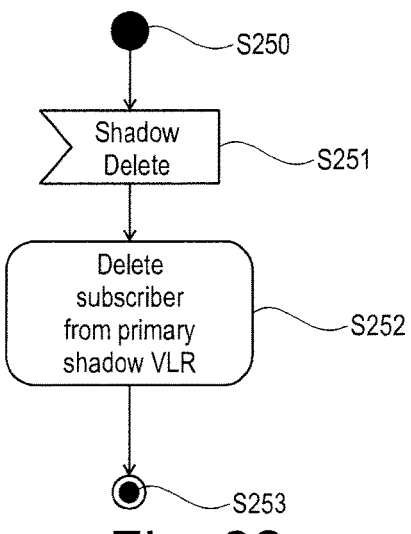
Fig. 22

OPERATING A POOL OF MOBILITY NODES

CROSS REFERENCE TO RELATED APPLICATIONS

This application is a 35 U.S.C. § 371 national stage application of PCT International Application No. PCT/EP2015/066573 filed on Jul. 20, 2015, the disclosure and content of which is incorporated by reference herein in its entirety.

TECHNICAL FIELD

Various embodiments relate to a method for operating a mobility node configured to track a mobility of a plurality of mobile entities and to the corresponding mobility node. Furthermore, embodiments relate to a method for operating a pool of mobility nodes, to the corresponding mobility node, to a computer program and to a carrier for the computer program.

BACKGROUND

Subscriber data is stored in a central database within the network, the Home Location Register (HLR) or Home Subscriber Server (HSS). When a subscriber attaches to the network, the subscriber becomes registered in a SGSN-MME (Serving GPRS Support Node-Mobility Managing Entity) and/or MSC (Mobile Switching Center), which fetches a copy of the subscriber data and stores it locally in the local subscriber database in SGSN-MME, respectively in the Visitor Location Register (VLR) in the MSC. When a mobile entity, also called UE (user equipment) hereinafter, is under LTE radio coverage and has CSFB/SMS (Circuit Switched Fallback/Short Message Service) capability and sends an attach request to the MME, the MME will perform a combined attach and will register the UE for CS (circuit switched) services in one MSC-S(Server). The SGSN-MME and the MSC-S only serve subscribers that have a corresponding record in the own locally stored subscriber database. The serving SGSN-MME or MSC keeps track of the current location of the subscriber and stores the serving area (RAI/TAI (Routing Area Indicator, Tracking Area Identity in the SGSN-MME and LAI (Location Area Identity) in the MSC) in the locally stored subscriber database.

In case of CS voice terminating call, to reach a subscriber, a message is sent on a broadcasting channel within the last known location area (RAI/TAI or LAI) of the subscriber. The UE informs the controlling node when the location changes and additionally updates the information in regular intervals, for example in the range of a few hours ("periodic RAU/TAU or LAU" (Routing Area Update, Tracking Area Update, Location Area Update). If the area of the subscriber is not known, paging needs to be performed within the entire area (paging all RAs/TAs in SGSN-MME or "global paging" in MSC), which could be an entire "pool" area when several MMEs or MSCs form a pool. Network capacity for large-scale paging is limited, and the volume of such attempts is throttled, which may lead to unsuccessful call attempts.

If an UE tries to access network services in an SGSN-MME or an MSC that does not have a data record of the subscriber, service is denied. In that case, the UE has to re-attach to the network to re-gain service. If subscriber data is lost due to an outage, the subscriber is not reachable for terminating calls until before the UE subscriber data has been re-covered or the subscriber re-attaches to the network.

In one configuration each SGSN-MME or MSC serves a different part of a radio network and is connected to different radio network controllers. Furthermore, it is possible to arrange SGSN-MMEs or MSCs in a pooled configuration where they share a common set of radio network controllers serving a common section of radio network. This is indicated in FIG. 1 in more detail. In the upper part of FIG. 1 a plurality of non-pooled MSCs 10 are provided, each MSC being connected to one or more corresponding radio network controllers 11. Each MSC could control one or more radio network controllers. A radio network controller is connected to one MSC. Each radio network controller 11 controls a radio network controller area 12 with several location areas 13. In the lower part, a pooled configuration is shown in which a plurality of pooled MSCs 20 share a common set of radio network controllers 21. The set of radio network controllers 21 serves a common section 22 of the radio network comprising the different location areas 13.

A node capacity is typically dimensioned in a way that pooled nodes are in n+m redundancy. This means at an outage of up to m nodes, the remaining nodes in the pool can handle the entire traffic load.

One of the challenges in pooling SGSN-MMEs or MSCs is how to identify the serving node for originating and for terminating transactions.

A UE that is attached to a network that employs pooled network architecture is always attached to exactly one of the pooled controlling nodes in each access domain (one SGSN-MME in the PS domain and one MSC in the CS domain). Transactions involving the UE can be set up in either of two directions: from a remote network user through the network towards the served UE (henceforth referred to as "terminating transaction") or from the served UE through the network towards a remote network user (referred to as "originating transaction"). A network user can be any telecommunication terminal that might get access to the telecommunication environment in order to initiate or receive calls, messages or any other telecommunication-related actions.

Typically, transactions are set up for voice calls or text messages (SMS).

For circuit switched terminating calls, a HLR keeps the controlling nodes addresses stored for every subscriber. In case of a terminating call, when the UE is located in the circuit switched domain, when the GMSC (Gateway MSC) requests routing information from the HLR, the HLR fetches a roaming number from the VLR of the MSC where the UE was registered during a combined or normal attach procedure.

Terminating transactions require the UE to be paged. To limit the coverage area within which paging needs to be performed, the last known area (RAI, TAI or LAI) is stored in the controlling node used for paging. This is symbolized by FIG. 2 where a HLR 15 keeps the VLR addresses which may be the corresponding controlling nodes where the VLRs are located, the controlling nodes being the pool of MSCs 20. Here, it is assumed that each MSC-S has exactly one co-located VLR. The HLR keeps the VLR address and fetches a roaming number (MSRN) from the VLR which is a routable number towards the serving MSC. For originating calls or location updates, the RNC 21 or the eNodeB sends messages that have an valid node indicator (GUMMEI (Globally Unique Mobility Management Entity Identifier) or NRI (Network Resource Identifier)) encoded in GUTI/P-TMSI/TMSI (Globally Unique Temporary Identifier, Preliminary Temporary Mobile Subscriber Identity) to one of the pooled SGSN-MME or MSC using weighted round robin. The weights of all SGSN-MMEs are administered in the RNC 21 or eNodeB and, for the MSC, are administered in the RNC 21. The RNC 21 or eNodeB sends messages that have a valid P-TMSI or GUTI to the SGSN-MME or respectively a valid TMSI to the MSC that is identified by the GUMMEI (for MME) or NRI (for SGSN and MSC).

Upon outage of a pooled SGSN-MME or MSC, another pooled SGSN-MME or MSC serves the subscriber after the next UE originating connection attempt, no automatic rebalancing is performed, once a failed control node is back to service.

For terminating calls, during the outage of a pooled SGSN-MME or MSC mobile terminating calls will fail, until the affected UE performs a location update or another originating connection attempt. Furthermore, for terminating calls, after the outage the UE remains unreachable until the next originating connection attempt from the UE.

For originating calls and location updates the situation is as follows:

The RNC or eNodeB uses supervision mechanisms to determine loss of activity towards an SGSN-MME or MSC which may take up to a few seconds. During the outage, after having determined loss of connectivity with the SGSN-MME or MSC that matches the GUMMEI or the NRI, upon the receiving of UE's first mobile originating transaction request, the radio controlling node, the RNC or eNodeB, sends messages that carry GUMMEI or NRI of the failed controlling node to one of the other similar controlling nodes (SGSN-MMEs for a failed SGSN-MME or MSC for a failed MSC) of the pool using a weighted round robin algorithm.

However, the transaction is rejected and the call attempt fails since the SGSN-MME/MSC on the receiving side does not recognize the GUMMEI or NRI. The UE then deletes the stored GUTI/P-TMSI/TMSI (with GUMMEI or NRI included) and performs a new attach/location update based on its IMSI (International Mobile Subscriber Identity). The RNC or eNodeB uses a weighted round robin to select an SGSN-MME or an MSC to send the message to, which registers the UE to that controlling node. If the UE is in the LTE domain and has CSFB/SMS capability, the MME will perform a combined attach and will register the UE also for circuit switched services in one MSC. The next originating or terminating call attempt will be then successful.

After outage without connection attempt from the UE, the first UE's originating connection attempt is (following the NRI) directed to the recovered SGSN-MME or MSC, which does no longer have the local subscriber database. When referring to the local subscriber database, both the local subscriber database in the SGSN-MME or the VLR database in the MSC are covered. The transaction is rejected and the call fails. The UE deletes the stored GUTI/P-TMSI/TMSI (with GUMMEI or NRI included) and performs a new attach/location update based on its IMSI. The RNC or eNodeB uses a weighted round robin algorithm to select an SGSN-MME or an MSC to send the message to, which registers the UE to that controlling node. If the UE is in the LTE domain and has CSFB/SMS capability, the MME will perform a combined attach and will register the UE for circuit switched services in one MSC. The next call attempt is successful.

This situation is summarized in FIG. 3 in which one of the MSC servers 20 experiences a disturbance so that the VLR data on this MSC is lost.

The above described situation has the following drawbacks. As discussed above, some terminating transactions terminating at a mobile entity will fail and further situations exist where originating transactions originating at the mobile entity will fail. Furthermore, to prevent identification of subscribers by eavesdropping on the radio interface, a mobile entity identifies itself by means of a temporary identification such as GUTI/P-TMSI or TMSI rather than a unique identification (IMSI) whenever possible. In the solutions discussed above, the UE's first originating connection attempt that was served by a pooled SGSN-MME or MSC before it fails will be rejected by the network and the mobile entity is forced to use the IMSI when reattaching to the network.

Furthermore, distribution of subscribers among the pool members is determined by the radio controllers which use weighted round robin with statically administered weight of pool members not taking actual load (for example number of served subscribers) of the pool members into consideration. This approach has drawbacks after recovery scenarios where the VLR data have been lost, when the recovered controller has low(er) load compared to the other controllers in the pool and so the load in the pool is not distributed evenly. Furthermore, the current mechanism leads to an imbalance of subscriber distribution between pool members. The imbalance continues to grow after recovery of the failed MSC, irrespective of the duration of the disturbance.

SUMMARY

Therefore, a need exists to avoid at least some of the above-mentioned drawbacks. In particular, a need exists to avoid that originating transactions or terminating transactions will fail due to an outage of a member in a pool scenario.

This need is met by the features of the independent claims. The dependent claims define further embodiments.

According to one aspect, a method is provided for operating a mobility node configured to track a mobility of a plurality of mobile entities in at least a section of a cellular network in which a pool of mobility nodes serve a common section of the cellular network. In the cellular network, for each of the mobile entities a unique identifier is used to uniquely identify the corresponding mobile entity and a temporary identifier is used to identify the corresponding mobile entity in at least one section of the cellular network. The method comprises at least the following steps carried out by one of the mobility nodes of the pool. A message is received for one of the mobile entities in which the mobile entity is identified by an unknown temporary identifier. An identification request is transmitted to a storage unit which stores information allowing a unique identifier to be determined based on a temporary identifier, the identification request requesting the unique identifier for said one mobile entity to be identified based on the unknown temporary identifier. Furthermore, a response to the transmitted identification request is received and the response comprises information allowing the unique identifier related to the received unknown temporary identifier to be determined. Additionally, a reaction message reacting to the received message is transmitted taking into account the unique identifier related to the unknown temporary identifier.

This method helps to overcome the weakness arising from existing solutions where a mobile entity in most of the cases identifies itself by means of a temporary identifier. This temporary identifier is only known by the serving mobility node such as the serving MSC or serving MME/SGSN. When the serving mobility node is unavailable due to a failure or has lost the mobile entity's related information, e.g. after a recovery, the mobility node receiving the message comprising the unknown temporary identifier can access a storage unit which can help the mobility node to identify the unique identifier relating to the received temporary identifier. Using the unique identifier, the mobility node receiving the message comprising the unknown identifier can now cope with the situation so that a transaction related to the message for which the unknown temporary identifier is received can be saved and does not fail. As a consequence, the storage unit allowing a mapping from the temporary identifier to the unique identifier can help to save transactions terminating at the mobile entity and transactions originating from the mobile entity.

According to another aspect, a method for operating the mobility node configured to track mobility of the plurality of mobile entities in at least a section of the cellular network is provided in which a pool of mobility nodes serve a common section of the cellular network with each of the mobile entities having an unique identifier which is used in the cellular network to uniquely identify the corresponding mobile entity and with a temporary identifier being used to identify the corresponding mobile entity in at least one section of the cellular network. For one of the mobility nodes of the pool, the method comprises the step of receiving a number request for a roaming number related to one of the mobile entities for a transaction terminating at said one mobile entity, wherein said one mobile entity is identified in the number request by the unique identifier. An identification request is transmitted to a storage unit storing information allowing the temporary identifier to be determined based on the unique identifier, wherein the identification request requests the temporary identifier for said one mobile entity to be identified based on the unique identifier. Furthermore, a response is received to the transmitted identification request, the response comprising information allowing the temporary identifier related to the received unique identifier to be determined. Furthermore, a reaction message reacting to the received number request is transmitted taking into account the temporary identifier related to the received unique identifier.

This further database, which allows the mapping from the unique identifier to the temporary identifier, has, first of all, the advantage of an improved privacy as the unique identifier does not have to be used and sent over the air interface as the temporary identifier is identified.

According to another aspect, a method for operating a pool of mobility nodes is provided serving a common section of the cellular network wherein each mobility node is configured to track a mobility of a plurality of mobile entities in at least a section of the cellular network. The method comprises inter alia the steps discussed above for one of the mobility nodes, wherein the storage unit storing the information allowing a temporary identifier to be determined based on a unique identifier is a first storage unit and the storage unit storing information allowing the unique identifier to be determined based on the temporary identifier is a second storage unit.

According to an aspect, a mobility node is provided configured to track the mobility of a plurality of mobile entities in at least a section of the cellular network in which a pool of mobility nodes serve a common section of the cellular network. As mentioned above, each of the mobile entities has a unique identifier and a temporary identifier. The mobility node comprises an interface configured to receive a message for one of the mobile entities in which the mobile entity is identified by an unknown temporary identifier. Furthermore, at least one processing unit is provided configured to initiate a transmission, via the interface, of an identification request to a storage unit storing information allowing a unique identifier to be determined based on the temporary identifier, the identification request requesting the unique identifier for said one mobile entity to be identified based on the unknown temporary identifier. The interface is furthermore configured to receive a response to the transmitted identification request, the response comprising information allowing the unique identifier related to the received unknown temporary identifier to be determined. The at least one processing unit is configured to transmit, via the interface, a reaction message reacting to the received message taking into account the unique identifier related to the unknown temporary identifier.

According to another aspect, a mobility node is provided configured to track the mobility of a plurality of mobile entities in at least a section of the cellular network. According to this aspect, the interface is configured to receive a number request for a roaming number related to one of the mobile entities for a transaction terminating at said one mobile entity, the one mobile entity being identified in the number request by the unique identifier. The mobility node furthermore comprises at least one processing unit configured to initiate a transmission, via the interface, of an identification request to a storage unit storing information allowing the temporary identifier to be determined based on the unique identifier. Furthermore, the identification request requests the temporary identifier for said one mobile entity to be identified based on the unique identifier. The interface is configured to receive a response to the transmitted identification request, the response comprising information allowing the temporary identifier related to the received unique identifier to be determined and the at least one processing unit is configured to transmit, via the interface, a reaction message reacting to the received message taking into account the temporary identifier related to the received unique identifier.

Furthermore, a pool of mobility nodes serving a common section of the cellular network is provided, wherein the pool comprises the mobility nodes mentioned above comprising the first storage unit allowing a temporary identifier to be determined based on the unique identifier and a second storage unit allowing the unique identifier to be determined based on a temporary identifier.

According to one aspect, a computer program comprising program code to be executed by at least one processing unit of a mobility node is provided, wherein execution of the program code causes the at least one processing to execute a method as mentioned above or as mentioned in further detail below.

Furthermore, a carrier comprising the computer program is provided, wherein the carrier is one of an electronic signal, optical signal, radio signal or computer readable storage medium.

It is to be understood that the features mentioned above and features yet to be explained below can be used not only in the respective combinations indicated, but also in other combinations or in isolation without departing from the scope of the present invention. Features of the above mentioned aspects and embodiments may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

FIG. 5 shows an example message flow when the failed MSC of FIG. 4 recovers.

FIG. 6 illustrates a possible imbalance of load occurring within a pool of MSC servers when an outage of one of the MSC servers occurs.

FIG. 20 illustrates an example flowchart comprising the steps carried at an MSC receiving an update message for one of the databases used to determined a temporary identifier based on a received unique identifier.

FIG. 21 illustrates an example flowchart of a method carried out at an MSC to update the storage unit used to determine a unique identifier based on a temporary identifier.

FIG. 22 illustrates an example flowchart comprising the steps carried by an MSC receiving a message to delete a subscriber from one of the databases.

DETAILED DESCRIPTION OF EMBODIMENTS

Figure 1:
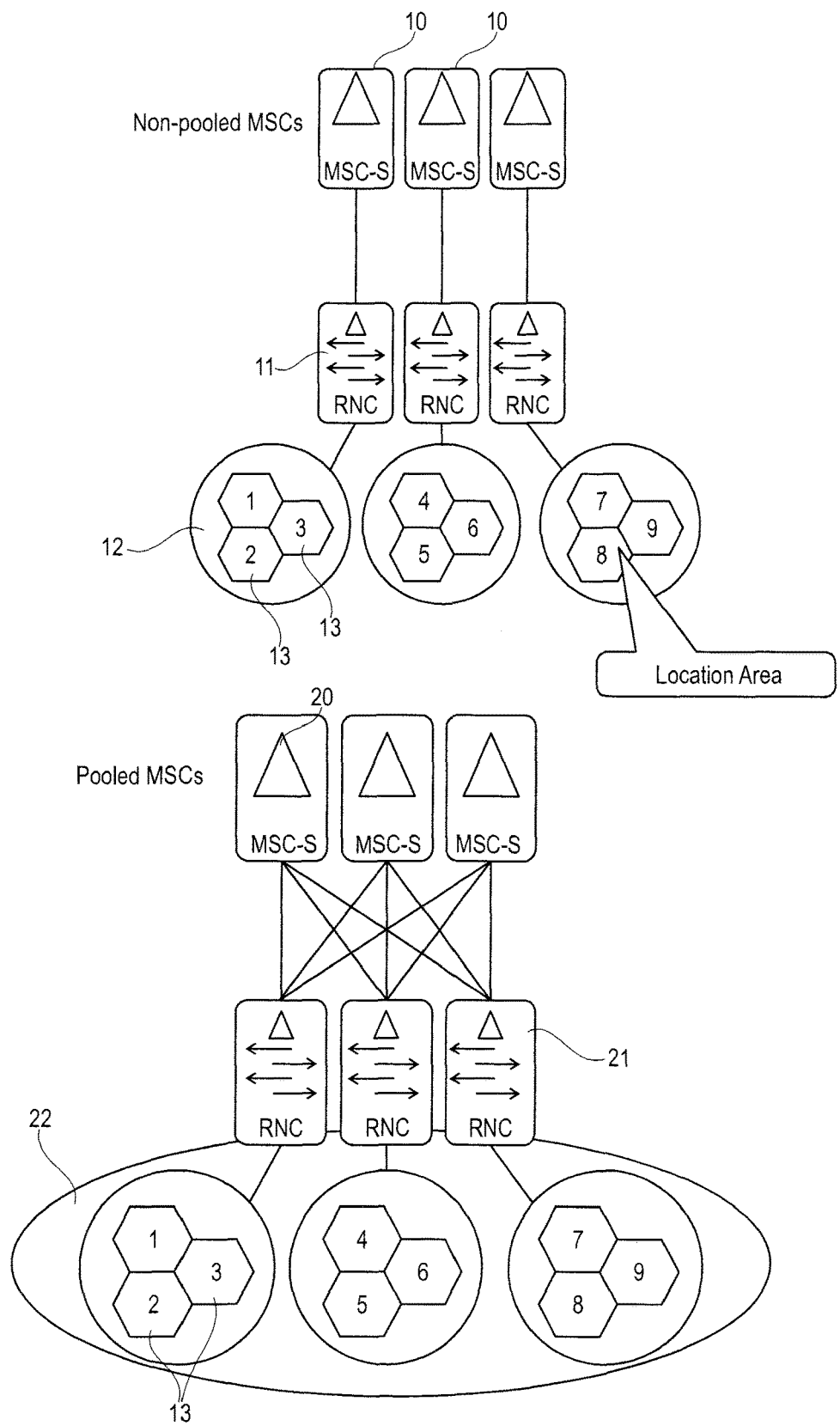
FIG. 1 shows an example architectural view with an non-pooled and pooled use of mobility nodes such as an MSC.
Figure 2:
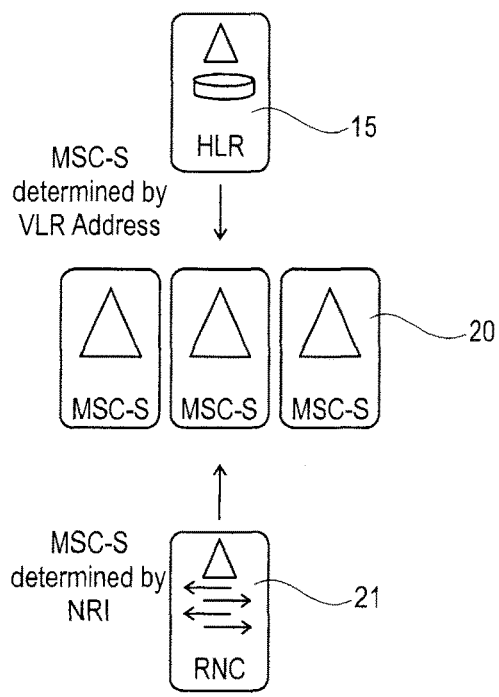
FIG. 2 illustrates an example architectural view describing the identification of a serving controlling node, e.g. the serving MSC in a pooled use of MSCs.
Figure 3:
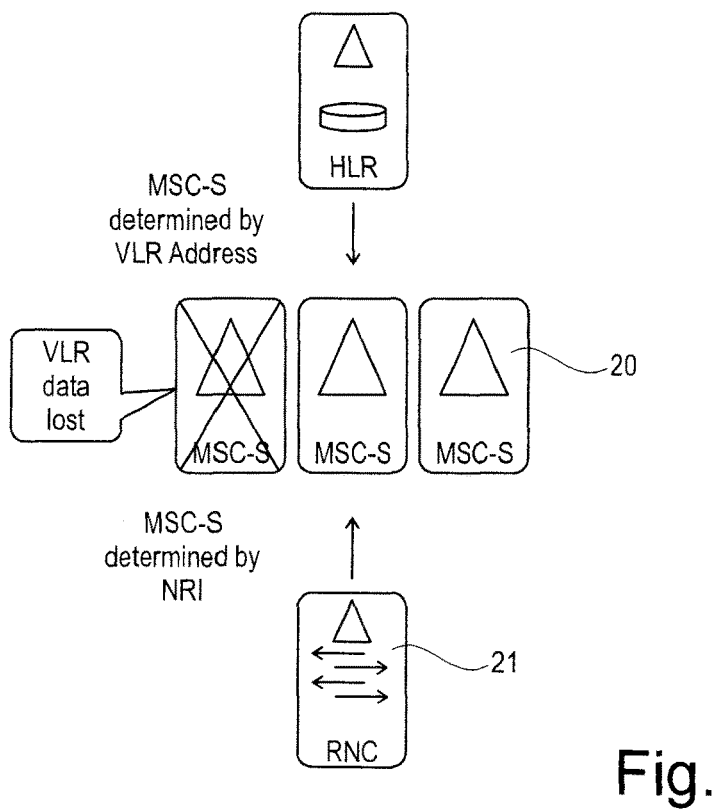
FIG. 3 shows the example situation of FIG. 2 with an outage of one of the MSCs.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components or physical or functional units shown in the drawings or described herein may also be implemented by an indirect connection or coupling. A coupling between components may be established over a wireless connection. Functional blocks may be implemented in hardware, firmware, software or a combination thereof.

Hereinafter, techniques are described how the failure of terminating or originating calls can be avoided when a mobility node operating in a pool of mobility nodes fails.

In the following description, reference is mostly made an MSC server (MSC-S) which checks the location of a subscriber and which partly also controls a terminating or originating transaction such as a call or an SMS service. As a consequence, in the following, reference is mostly made to parameters valid in the context of an MSC as a mobility node configured to track a mobility of a mobile entity. However, it should be understood that instead of an MSC server an MME or SGSN may be used. In the table given below, the parameters and concepts specific to each of the mobility or controlling nodes is given so that when the invention is described with one of the three entities and the corresponding parameters, the invention may also be valid for the other two nodes with the corresponding parameters.

SGSN and MME are two separate logical nodes, which may or may not be integrated to the same HW platform or product.

| Parameter or Concept | MME | SGSN | MSC-S |
|---|---|---|---|
| Radio access | LTE (4G) | GSM (2G), WCMA (3G) | GSM (2G), WCMA (3G) |
| Switching technology | PS | PS | CS |
| Pooling concept | MME Pool | SGSN Pool | MSC Pool |
| Node identifier | GUMMEI | NRI | NRI |
| UE temporary identifier | GUTI | P-TMSI | TMSI |
| Serving Area | TA | RA | LA |
| Subscriber Database | Local Subscriber Database | Local Subscriber Database | VLR |
| Radio controlling node | eNodeB | BSC (2G), RNC (3G) | BSC (2G), RNC (3G) |
| UE registration | (Combined) Attach | Attach | Location Update/Registration/Attach |

Reference will be made inter alia to a user entity, UE. The UE may be any type of communication device, e.g. a mobile phone, a portable computer, a laptop, a smart television screen, a tethering access point node, a vehicle like, for example, a car implementing communication functionality, etc.

In the following it will be described in connection with FIG. 4 and FIG. 5 how an improved UE terminating call handling mechanism makes a subscriber reachable for terminating call, both during and after outage of the serving MSC, without dependence on prior originating transactions. In the following, it is assumed that a pool of MSC servers 20*a*-20*d* is used, and for every VLR, a first storage unit, also called first shadow VLR hereinafter, is assigned that is co-located with one of the other pooled MSCs or located in a central database (not shown).

Figure 4:
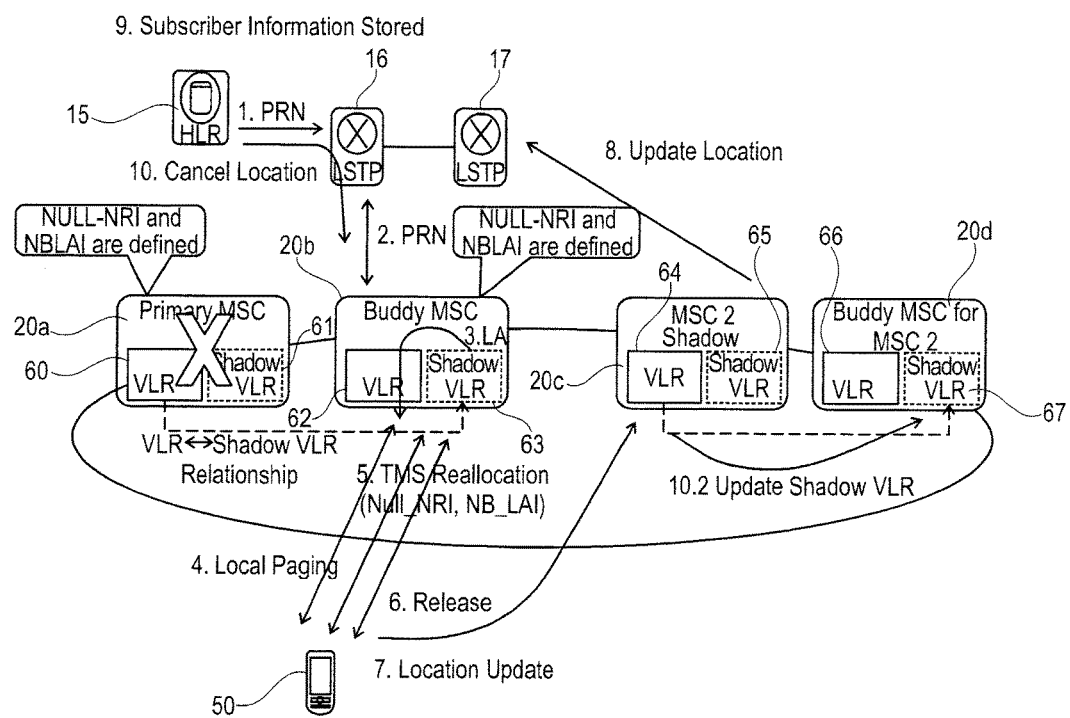
FIG. 4 shows an example message flow in a cellular network with an enhanced mobile terminating call handling mechanism making a subscriber reachable for terminating calls both during and after an outage of a serving MSC.

As can be deduced from FIG. 4, during the outage of the serving MSC 20*a* terminating calls terminating at the failed MSC 20*a* are handled as follows:

In step 1, a message requesting a "Provide Roaming Number" for a mobile terminated calls of a UE 50 located served by the failed MSC 20*a* will be sent from an HLR 15 to a signaling transfer point, STP, 16 which is indicated as being the local STP, LSTP in FIG. 4. In step 2, the STP 16 redirects this Provide Roaming Number message (PRN message) to the buddy MSC 20*b* of the failed MSC 20*a*, which holds the shadow VLR 63 where the corresponding VLR information of VLR 60 of the failed MSC 20*a* is stored (for example the location area identity (LAI) information of the UE 50).

In step 3, the buddy MSC 20*b* does not find the subscriber in its VLR 62 and then checks the shadow VLR 63 of the failed MSC 20*a*. The buddy MSC 20*b* finds the UE 50 in the shadow VLR 63, extracts the LAI from it and uses the LAI to perform a paging of the UE 50 within the location area identified by the LAI in step 4.

In step 5 of FIG. 4, the buddy MSC 20*b* allocates a new TMSI to the UE, providing NULL-NRI and NB-LAI. NULL-NRI is an NRI not allocated to any controlling node from the pool. By using a NULL-NRI in a reallocation command, the radio controlling node will be forced to redistribute the UE among the pool according with the defined capacity weights of the pool members. NB-LAI is a LAI that does not exist in the network. When NB-LAI is sent, the UE will be forced to perform a new location update. If only NB-LAI is sent in the command, TMSI will remain unchanged and the UE will remain located in the same controlling node. When both NULL-NRI and NB-LAI are sent, redistribution will be triggered. This step may be carried out to make sure that the UE 50 emigrating from the failed MSC are distributed amongst the remaining MSCs instead of all being served by the MSC that hosts the shadow VLR or first database. In step 6, the connection to the UE 50 is released and in step 7, the UE 50 triggers a location update due to the received non-broadcast LAI. A radio network controller RNC (not shown) re-balances the UE within the pool due to the NULL-NRI to MSAC 20*c*. The new MSC 20*c* comprising VLR 64 and shadow VLR 65 then updates its VLR 64 (not shown) and sends in step 8 an updated location towards the HLR 15, HLR 15 stores the UE information and sends a cancel location message to MSC 20*b* to trigger the deleting of the UE 50 related entry in the shadow VLR 63 of MSC 20*b*. Further MSC 20*c* updates in step 10.2 its shadow VLR 67 located in the buddy MSC 20*d* by storing the UE 50 information in the shadow VLR 67. MSC 20*d* furthermore comprises VLR 66. Step 10.2 may be performed before or in parallel to steps 8, 9 or 10.

With this solution a first mobile terminated call attempt after a MSC outage will still fail, but later mobile terminated call attempts will succeed since the UE 50 is attached to a new MSC 20*c* after the described procedure above. A solution how a first mobile terminated call does not fail will be discussed later in connection with FIG. 8 and the following.

Turning now to FIG. 5. Unless a UE 50 had any transactions ongoing during the outage of MSC 20*a*, it will not yet be registered in a different MSC (e.g. buddy MSC 20*b*). After the failed MSC 20*a* recovers, terminating calls for the UE 50 that had no interaction are handled as discussed in connection with FIG. 5 below.

In step 1 of FIG. 5, a "Provide Roaming Number" for mobile terminating calls is sent from the HLR 15 to the STP 16. In step 2, the STP 16 sends the PRN message to the primary MSC 20*a*, which has lost its VLR entry in VLR 60 after it recovered from the outage and fetches location area information of the UE 50 from the shadow VLR 63 located in the buddy MSC 20*b*. In step 3, the primary MSC 20*a* restores the VLR data from the HLR 15, and in step 4 the HLR 15 inserts UE 50 to the VLR 60 of the primary MSC 20*a*. In step 5, an IAM message (Initial Address Message) arrives from a Gateway MSC (not shown) at MSC 20*a* with a roaming number, and in step 6, the primary MSC 20*a* performs a local paging, using the location area information stored in its VLR 60.

As mentioned in the background section, the original SGSN-MME and MSC pool solutions rendered the subscribers that were served by a failing SGSN-MME or MSC unreachable for terminating access until the first mobile originating transaction or until after the outage. Even after the outage, only mobile originating events will trigger a new registration of the affected subscribers. This time period is limited by the periodic location update timer which is configured on network level and typically has a value in a range of a few hours. With the embodiment discussed in connection with FIGS. 4 and 5, the situation is improved. However, the first terminating call attempt during the MSC outage will fail. In case of a failed MME, when the UE is under LTE coverage, any mobile terminating call will fail until the mobile entity re-attaches to another MME member of the same pool and the new MME will perform a combined attach to the same MSC or a different MSC if the call is a call originating in the LTE domain (VoLTE originating calls).

However, the first mobile originating transaction after the beginning of the outage is unsuccessful. The same is valid also for the first mobile originating transaction after the outage for the recently recovered node.

Furthermore, to prevent identification of subscribers by eavesdropping on the radio interface, a mobile entity identifies itself by means of a temporary identification (GUTI (Global Unique Temporary Identifier), P-TMSI (Preliminary Temporary Mobile Subscriber Identity) or TMSI) rather than using the permanent and unique identification such as the IMSI (International Mobile Subscriber Identity) whenever possible. With known solutions, the first originating connection attempt by a mobile entity that was served by a pooled SGSN-MME or MSC before it fails will be rejected by the network and the mobile entity is forced to use the IMSI when re-attaching to the network.

Furthermore, a failure of a member of the pool leads to an imbalance of the load within the pool. Distribution of subscribers among the pool members is solely determined by the radio controllers. These use weighted round robin, with statically administered weight of pool members, not taking actual load of the pool members into consideration. This approach turns out to be sub-optimal after recovery scenarios, as discussed below.

Any of the existing pool solutions leads to imbalance in the pool. During the outage, a flow of subscriber registration occurs that distributes subscribers away from the failing node to the remaining nodes of the same type members of the same pool.

When the failed node recovers, this flow is replaced by a flow that distributes the subscribers that are not yet redistributed amongst all pool members, growing load to the other nodes even after recovery. The recovered node serves in the end only a fraction of the subscribers it was originally serving and the other pool members may reach the dimensioned capacity, esp. if further nodes are subsequently failing.

The imbalance can be removed by operational procedures. This requires supervision and appropriate reaction by the administrative staff. If corrective action is not taken in time, repeated failure of pooled nodes can lead to load saturation of individual pool members, resulting in service disturbance.

In FIG. 6, the upper chart shows the number of subscribers served by MSC 20a before and after an outage (downtime) in connection with FIGS. 4 and 5. For the duration of the outage (downtime) of MSC 20a, the number of subscribers served by MSC 20a drops from 6.1 to zero. When MSC 20a recovers, it regains subscribers due to originating transactions and terminating transactions. With the solution of FIG. 5, then all subscribers that have a terminating transaction as first transaction after recovery will continue to be served by MSC 20a and subscribers that have an originating transaction as first transaction after recovery will be distributed on all pool members (solid line). If the solution of FIG. 5 is not used, then subscribers that were previously served by MSC1 will be distributed on all pool members. The number of served subscribers would stabilize (dashed line) at a value 6.2 which is below the value that MSC 20a should serve (like e.g. 6.1 before the outage) with respect to the weight it has within the pool.

The other chart below of FIG. 6 shows the number of subscribers served by MSCn that is member of the same pool as MSC 20a in which the solution of FIGS. 4 and 5 is active. Beginning with the outage of MSC 20a, the number of subscribers served by MSCn increases (dashed line) from 6.5 towards the highest value 6.3 that is determined by distributing all subscribers previously served by MSC 20a to the remaining pool members, considering the relative weight of the remaining pool members within the remaining pool. As soon as MSC 20a is available again, the number of subscribers served by MSCn continues to grow (solid line), but the upper limit is lower (6.4). Not all subscribers originally located in MSC 20a will be redistributed among the other pool members during the outage (e.g. in a pool with 5 MSCs, with N subscribers/MSC, in the eventuality MSC 20a remains down until full redistribution is concluded, the remaining 4 members will have in the end N+N/4 subscribers each—this is called the "upper limit". In case the MSC 20a recovers before full redistribution is concluded, the other pool members will never reach the "upper limit" 6.4,—since MSC 20a will regain some of its originally served subscribers. With the solution of FIG. 5, MSCn will still get a share of subscribers previously served by MSC 20a that have an originating transaction as first transaction after the outage (solid line). Without the solution of FIG. 5, then MSCn will get a share of subscribers that have either an originating or a terminating transaction as first transaction after the outage. The number of served subscribers will stabilize at a value around 6.4 which is above the value 6.5 that MSCn should serve with respect to the weight it has within the pool.

Figure 7:
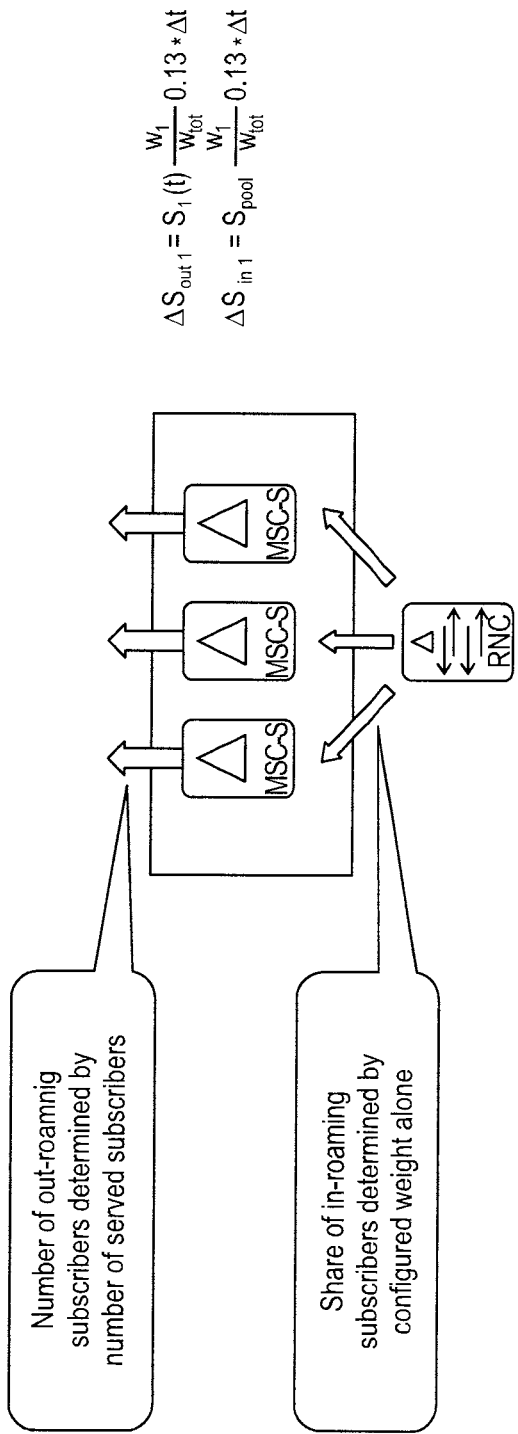
FIG. 7 shows an example situation how a network controller distributes roaming subscribers to different mobility nodes.

The roaming in and out of the pool area as shown in FIG. 7 may be the only traffic activity over time that will lead to a backflow of subscribers. However, this will not restore the balance as desired due to a preconfigured weight in a decent amount of time. Thus, a realistic way to restore the balance within a certain time may be to order a manual redistribution.

The invention has recognized that the weakness of existing solutions arises from the fact that the UE in most cases identifies itself by means of TMSI, which is so far only known by the serving MSC. The invention suggests a mechanism to serve the subscriber even when the serving MSC is unavailable or has lost the related information. Two storage units or databases are introduced, which are distributed over the pooled nodes, for example the MSCs:

A primary storage unit or primary shadow VLR or first storage unit, which may be used only for terminating calls and which allows a mapping from IMSI to TMSI and which stores other information that may not be reconstructed from the HLR, such as the location area (LAI) and the serving MME/SGSN address. Each MSC or each mobility node may have exactly one primary shadow VLR or primary storage unit, which stores the mapping data for all subscribers. Furthermore, one common primary shadow VLR or first storage unit for several MSCs, for all MSCs of one pool or for the whole network may be used. Part of this primary storage unit or primary shadow VLR has already been disclosed in connection with FIGS. 4 and 5. One primary storage unit or primary shadow VLR may be provided for each access type, however, a common primary shadow VLR for all access types may also be used to store P-TMSI or GUTI, the last known RAI or TAI and the corresponding MSC address/identity.

A second storage unit or secondary shadow VLR, which allows mapping from TMSI to IMSI and, if applicable, optionally storing the serving MME/SGSN address (for EPS (Evolved Packet System) or Gs-attached subscribers). The MSC or mobile entity that stores the secondary shadow VLR or second storage unit data for a specific subscriber may be determined by hashing on TMSI—that would allow a uniform distribution of secondary shadow VLR data among the pool member, by using the NRI component of the TMSI—that would allow a fixed allocation of the secondary shadow for all subscribers located in one MSC or by other addressing methods that would allow simple identification of the secondary shadow VLR location in the network. However, it should be understood that the two storage units or shadow VLRs can also be located in a dedicated node in the network, can share the same database content and may be common or specific for one or more of the available access technologies. In that case, no hashing needs to be performed, but any mobile entity or MSC from the pool that needs to access the stored data can directly communicate with the corresponding central shadow VLR or storage unit. The secondary shadow VLRs of SGSN or MME can store P-TMSI or GUTI and the corresponding MSC address/identity.

In the following description the terms primary/secondary shadow VLR are used in a not limiting manner and could be also replaced by the alternative names outlined above (for example first/second storage unit or database).

For originating calls, when RNC detects unavailability of a pooled MSC and distributes the message to any of the remaining MSCs, or when the serving MSC has recovered after outage and lost all VLR data during the outage, the receiving MSC will apply hashing on TMSI to determine the location of the secondary shadow VLR data which allows to map TMSI to IMSI and to get the serving MME/SGSN address. Knowledge of IMSI is a precondition to fetch subscriber data from HLR and to continue with call setup.

For terminating calls, when a pooled MSC1 is unavailable and STP reroutes PRN message towards MSC2 that keeps the primary shadow VLR for said MSC1. The LAI is stored there and can be used to perform local paging. RNC, detecting unavailability of the MSC1 pointed out by NRI, distributes the paging response to any of the remaining pooled MSCs (for example MSC4). Using first the TMSI to IMSI mapping in secondary shadow VLR, the MSC receiving the paging response from the RNC notifies the MSC2 hosting the primary VLR about the paging response. The MSC2 hosting the primary shadow VLR is known to be associated with the unavailable MSC1 that served the subscriber, as pointed to by the NRI encoded within the TMSI. The MSC2 holding the primary shadow VLR sends PRN response back to the HLR including MSRN pointing to the visited MSC4.

In the following, the different solutions and how the two storage units/Shadow VLRs are used to avoid a call failure will be explained in more detail.

In connection with FIG. 8, an example of a terminating WCDMA call (Wide Band Code Division Multiple Access) during the outage of a pooled MSC (here MSC1) will be discussed. In the following it is assumed that the serving MSC1 is at outage for the terminating call. In step S1, an initial address message IAM is received at the Gateway MSC (GMSC). In step S2, a Send Routing Information (SRI) request is sent to the corresponding HLR, and in step S3, a Provide Roaming Number request, PRN request is sent from the HLR to a signaling transfer point STP. The STP then re-routes the PRN message to a different MSC as MSC1, which should handle the call at outage of MSC1. In the embodiment shown in FIG. 8, the PRN request message is sent from STP to MSC2 (step S4). MSC2 maintains the primary shadow VLR for MSC1 which allows a temporary identifier (e.g. TMSI) to be determined based on a unique identifier (e.g. IMSI) and a corresponding look up by using the IMSI as input is carried out (this step is not shown explicitly in FIG. 8, but will be explained in connection with FIG. 27 later on). Analyzing the NRI encoded in the TMSI, MSC2 determines that the subscriber was not previously served by MSC2 and that the call is a WCDMA call. MSC2 then performs a local paging, using the LAI restored from the primary shadow VLR. Thus, a paging request is sent to the RNC in step S5.

The RNC cannot send the paging response to the MSC1 identified by NRI included in the TMSI because MSC1 is unavailable. Therefore the RNC sends the paging response to a, arbitrarily selected MSC in the pool (step S6). When the selected MSC of the pool, in the figure depicted as MSC4, receives the paging response from the RNC, it will from then on serve the subscriber (The selected MSC could be also MSC2 (not shown), where then the next messages/steps described between MSC2 and MSC4 would be handled MSC2 internally). If MSC4 receives TMSI with an NRI other than its own, then instead of rejecting the message, MSC4 sends a Provide IMSI request based on TMSI to the secondary shadow VLR located on MSC3 (step S7) and receives the response with the IMSI in step S8. MSC4 sends an enhanced paging response message to MSC2 (step S9) that comprises additionally also the temporarily assigned roaming number, e.g. an MSRN (Mobile Subscriber Roaming Number), the MSRN being used to route terminating calls from a GMSC to MSC4. The enhanced paging response message to MSC2 (step S9) may be also send between step S6 and S7, since the IMSI is not needed for enhancing the paging response message S9. The temporarily assigned roaming number will be provided by MSC4. MSC4 uses NRI from TMSI to determine the failed MSC1 and it knows the buddy of each pool member which is MSC2 for MSC 1 in this case. Thus, the MSC2 can now answer the Provide Roaming Number request by sending the PRN response with the temporarily assigned roaming number (e.g. the MSRN) to the HLR (steps S10 and S10a). The latter then transmits the SRI response to the GMSC (step 10b).

MSC4 can perform, before or after sending the enhanced paging response in step 7, hashing of the TMSI to find the MSC3 with the secondary shadow VLR which allows to determine a unique identifier based on a temporary identifier. The MSC4 queries the secondary shadow VLR with a Provide IMSI message (PIMSI request message) to map the received unknown TMSI to IMSI and optionally to fetch the MME/SGSN address (steps S9 and S10). A Shadow Delete Message may be sent to MSC2, which maintains the primary shadow VLR in order to delete the not anymore needed entry from the primary shadow VLR in MSC2 (step S11).

MSC4 registers itself as serving MSC by sending an update location request message to the HLR in step S12. With the update location request message (step 12) MSC4 indirectly and optionally requests subscriber data from HLR. The HLR may provide subscriber data by sending "Insert Subscriber Data" to MSC4 (step S13). The MME/SGSN address fetched from the secondary shadow may be attached to the new subscriber profile in the VLR of MSC4. Optionally a response message is sent back to the HLR in step S14. Furthermore, an update location response message may be transmitted to MSC4 (step 15).

The GMSC uses the MSRN received with the SRI response message in step S8*b* as called party number to send an initial setup message, e.g. an IAM message in step S16 to MSC4 and the call setup continues in steps S17 to S19 as known. Due to the fact that the UE is now registered in a different MSC than before (MSC4 instead of MSC1), a new TMSI with NRI of the new serving MSC4 needs to be assigned to the UE and the old primary shadow VLR entry is to be deleted as carried out in step S11 mentioned above. Furthermore, the new data (e.g. new TIMSI) have to be written into a new primary shadow VLR located for example at MSC5 (not shown). MSC5 in turn updates the secondary shadow VLR with the new TMSI and the MME/SGSN address (steps S22 to S23) and removes the old secondary shadow VLR entry. Since the location of the secondary shadow VLR may depend from the TIMSI, and since a new TMSI is assigned to the UE, the location of the secondary shadow VLR (e.g. the MSC of the pool holding the secondary shadow VLR entry for the UE) may change.

Figure 8:
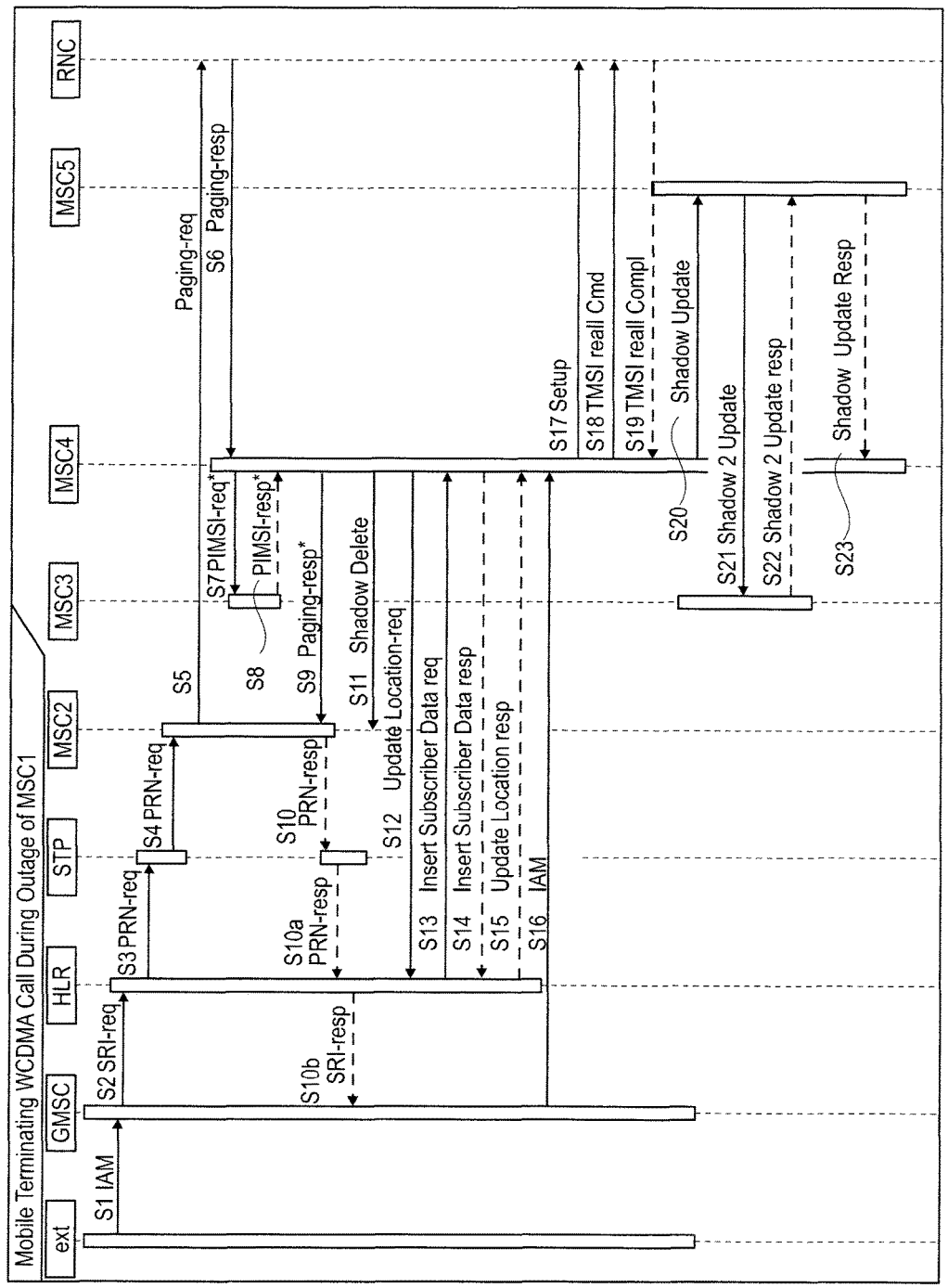
FIG. 8 illustrates an example of a message flow for a terminating WCDMA call during an outage of one MSC in a pool of MSCs and how the loss of this terminating call is avoided.

From the above discussion of FIG. 8 it can be deduced that no changes are needed at RNC. The first terminating call attempt for a UE after the outage of a serving MSC will be successful and the UE will be served by a new MSC (in the example above MSC4). Furthermore, the solution of FIG. 8 provides an increased security on the air interface as IMSI is not used for the shown transactions over the air interface.

Figure 9:
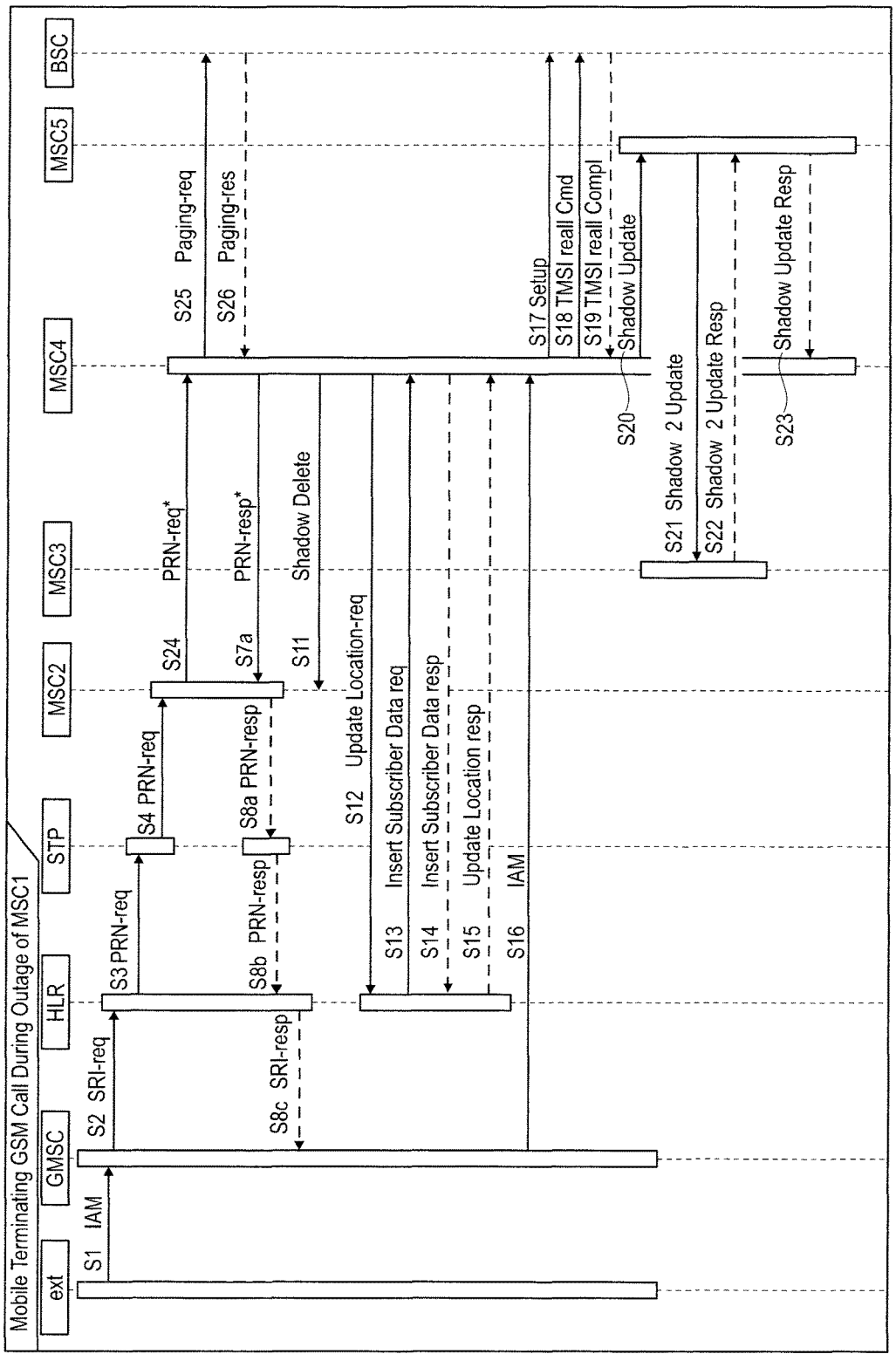
FIG. 9 illustrates an example of a message flow of a terminating GSM call set up during an outage of one MSC of the pool and how the terminating call is successful.

In connection with FIG. 9, an example of a terminating GSM call setup is discussed during outage of a pooled MSC (here MSC1). The steps shown in FIG. 9 having the same reference numerals as the steps shown in FIG. 8 correspond to the steps discussed above in connection with FIG. 8 and are not explained in detail any more. As explained after step S4 of FIG. 8, the received IMSI is mapped to the TMSI using the primary shadow VLR located in MSC2 (this step is not shown explicitly in FIG. 9, but will be explained in connection with FIG. 27 later on). Based on the TMSI MSC2 detects that the call is a GSM call and forwards an enhanced PRN request, comprising also the TMSI of the UE, to another MSC within the pool (step S24) which shall become the new serving MSC for the UE previously server by MSC1. MSC2 selects the another MSC by for example a weighted random distribution from all members of the pool to obtain a better distribution of the load. The selected MSC in the present example is MSC4, however it could be also MSC2 (not shown, if MSC2 would be selected the next messages/steps described between MSC2 and MSC4 would be handled MSC2 internally). In the present example MSC4 receives the enhanced PRN request comprising the TMSI. In FIG. 9, a paging request is sent in step S25 from MSC4 to the BSC and a paging response is sent back to the MSC4 in step S26. In order to become the serving MSC for the UE, the MSC4 may select an unallocated temporarily assigned roaming number (e.g. a MSRN) from a pool of temporarily assigned roaming numbers and sends it back to the HLR in the PRN response message via MSC2 (step S7*a*) The PRN response S7*a* comprises the temporarily assigned roaming number (e.g. the MSRN) In step S8*a* and S8*b* The PRN response is further sent to the STP and HLR as discussed above. From HLR a SRI response is transmitted to GMSC in step S8*c*. The selected temporarily assigned roaming number (the MSRN) is now tied to the IMSI that was included in the PRN operation for a certain period of time: an incoming call using that specific MSRN will trigger a paging to the TMSI connected to that IMSI. Additionally, a new TMSI is assigned after the call is finished: a TMSI reallocation command is sent with a NB-LAI and a TMSI with a valid NRI that belongs to the MSC (here MSC4) that has handled the call (to prevent further redistributions). The primary/secondary shadow VLRs are updated as explained in connection with FIG. 8.

From the above discussion of FIG. 9 it can be deduced that no changes are needed at the BSC. The first terminating call attempt for a UE after the outage of a serving MSC will be successful and the UE will be served by a new MSC (in the example above MSC4). Furthermore, the solution of FIG. 9 provides an increased security on the air interface as IMSI is not used for the shown transactions over the air interface (instead the TMSI is used). On top of that, no paging in the whole MSC/pool area (global paging) is performed, instead paging in a LAI where the UE is roaming is performed.

Figure 27:
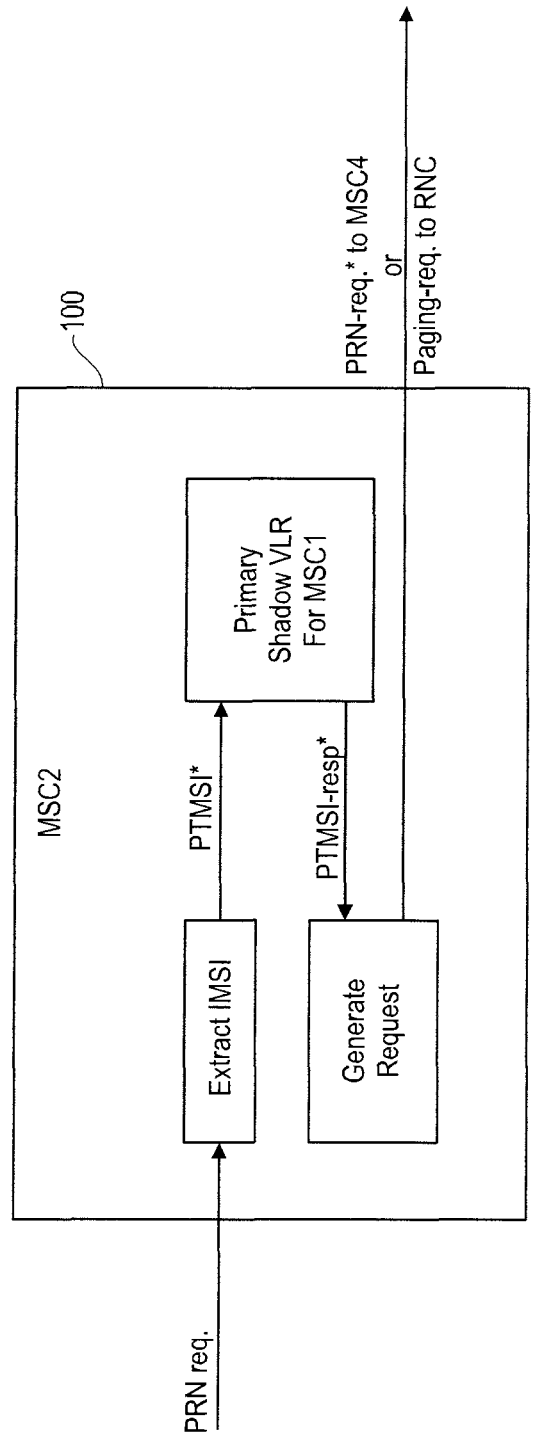
FIG. 27 illustrates an example of an internal message flow in an MSC accessing an internal primary shadow VLR.

FIG. 27 shows the internal message flow when an MSC 100, e.g. the MSC2 of FIGS. 8 and 9 accesses the internal primary shadow VLR of MSC1. This step can happen between steps S4 and S5 of FIG. 8 or between steps S4 and S24 of FIG. 9. The MSC 100 receives a PRN request as shown in step S4 of FIG. 8 or 9. From this request, the IMSI is extracted and a request (PTMSI*) for providing the corresponding TMSI is transmitted to the corresponding primary shadow VLR which is stored in MSC 100 (with respect to FIGS. 8 and 9 MSC 100 equals MSC2 which stores the primary shadow VLR of MSC1). The primary shadow VLR provides then the requested TMSI so that the following request can be generated, which is either the paging request to the RNC of step S5 of FIG. 8 (if the call is a WCDMA call) or the PRN request to MSC4 in step S24 of FIG. 9 (if the call is a GSM call).

Figure 10:
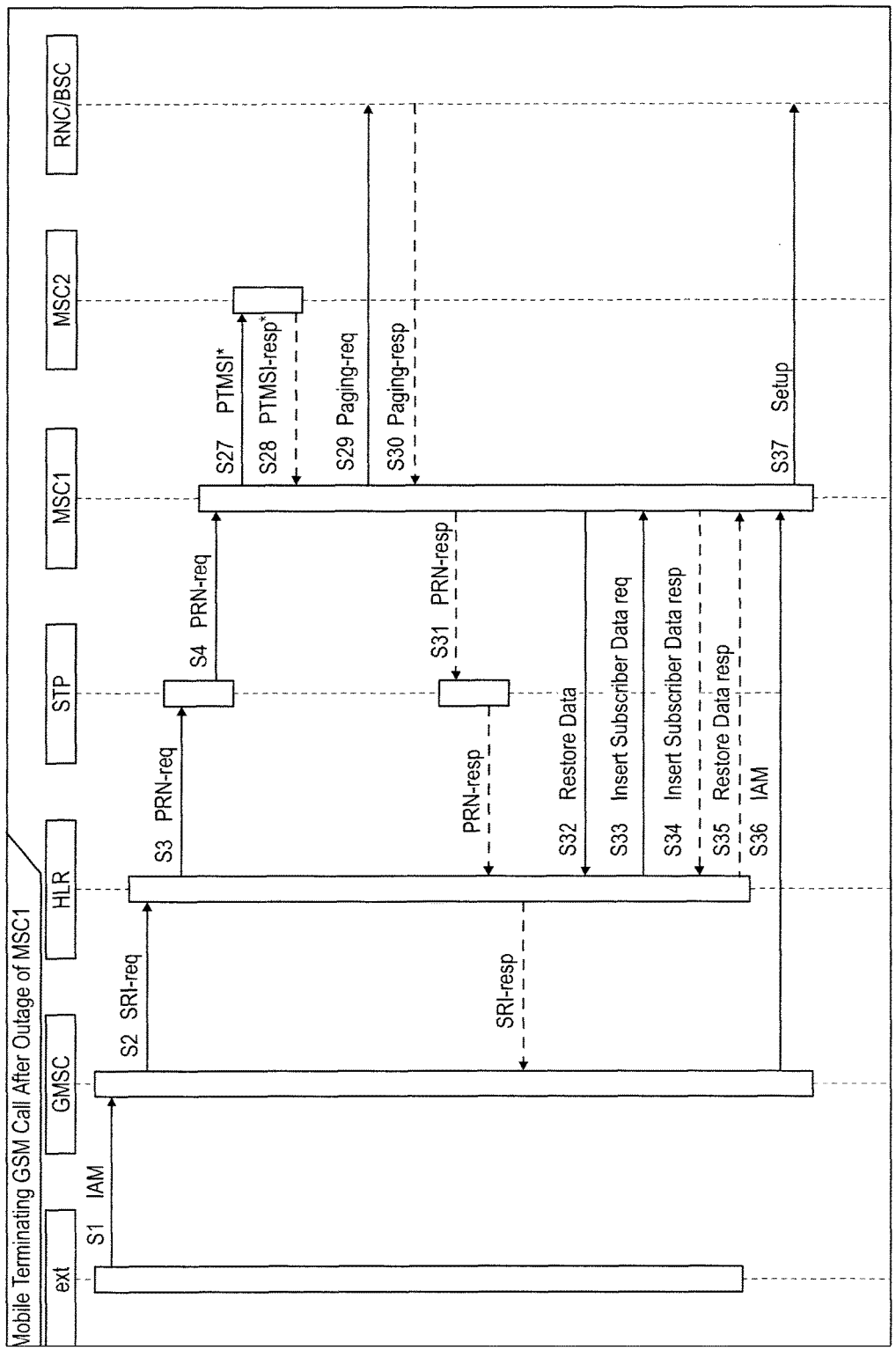
FIG. 10 illustrates an example of a message flow for a mobile terminating call after an outage of one MSC of the pool and how this call is saved.

FIG. 10 discloses an example of the handling of a GSM or WCDMA terminating call setup after recovery of a pooled MSC. MSC1 has recovered from an outage, but has lost the information relating to own subscriber profiles of UEs served by MSC1 before its outage (for example the VLR content). Steps 51 to S4 correspond to the steps discussed above in connection with FIG. 8, except that the STP sends the PRN request in step 4 to the recovered MSC1 since it is available again. When the MSC1 receives the PRN request (which includes the IMSI), MSC1 recognizes that the related VLR entry for the IMSI is missing and queries the primary shadow VLR located in MSC2 in step S27 to request the missing VLR data from the primary shadow VLR. There is no VLR entry corresponding to the received IMSI and MSC1 attempts to recover the information related to it from its primary shadow VLR. The query in step S27 comprises the IMSI. MSC2 extracts from the primary shadow VLR the TMSI and LAI for the given IMSI and provides in step S28 a response comprising, among other information, the TMSI and the LAI for the given IMSI. MSC1 analyzes the NRI encoded in the received TMSI and determines that the subscriber was previously served by this MSC1. MSC1 possesses now the information to page the UE in order to continue the call setup. The paging request and response in steps S29 and S30 correspond to the steps S25 and S26 of FIG. 9 with the difference that they are linked to MSC1 and not MSC4 as in FIG. 9. In the same way, the PRN response transmitted back to the HLR in step S31 corresponds to step S8 with the difference that it is sent form MSC1 and not MSC2 as in FIG. 8. In step S32, the MSC1 sends restore data request to the HLR in order to receive the UE's subscriber data from the HLR. Step S33 corresponds to the "Insert Subscriber Data" request, step S34 being the corresponding response and step S35 being the restored data response to message 32. The IAM message or initial setup message of step S36 and the setup message in step S37 correspond to steps S16 and S17 with the difference that MSC1 and not MSC4 is involved as in FIG. 8.

From the above discussion of FIG. 10 it can be deduced that no changes are needed at the RNC/BSC. The first terminating call attempt for a UE after the recovery of an outage of a serving MSC (here MSC1) will be successful and the UE will be continued to be served by MSC1. In addition with the present embodiment further subscriber redistribution in the pool is avoided, since the UE is continued to be served by the recovered MSC1 and not assigned to a different MSC from the pool like it could happen in the earlier solution (which would then mean further increasing the load of the other pool members while "decreasing" the load of the recovered MSC1).

In connection with FIGS. 8 to 10, terminating transactions were discussed. In the following, originating transactions originating at the mobile entity will be explained in more detail assuming an outage of MSC1 where the mobile entity is attached to.

When reference was made to a TMSI in FIGS. 8 to 10, it should be understood that the TMSI is used for one access type. Depending on the available access type, the UE may have a GUTI, P-TMSI or a TMSI. Furthermore, it should be noted that the storage unit query may be only performed if the mobility node does not recognize the received temporary identifier, e.g. when the serving mobility node is not available to receive the request for a roaming number and the request is diverted to another mobility node belonging to the same pool.

In connection with FIG. 11, an example of an GSM or WCDMA originating call setup during an outage of a pooled MSC (MSC1) will be explained in more detail. In step S40, a connection management service request is sent from RNC/BSC to MSC4. Upon detection of the unavailability of the MSC identified by NRI (here MSC1) included in TMSI, the RNC/BSC may route any such message by means of for example a weighted round robin to any of the remaining members of the MSC pool, here MSC4. When the pooled MSC, MSC4, receives a transaction from RNC/BSC comprising TMSI with an NRI other than its own, instead of rejecting the message with "subscriber unknown" fault code, it accesses the secondary shadow VLR, e.g. by performing hashing on TMSI to find MSC3, which in the example shown contains the secondary shadow VLR. Thus, for example after the answer in step S41 to the connection management service request, MSC4 queries the secondary VLR in MSC3 for the IMSI by providing the TMSI in step S42. Thus, an identification request is transmitted to the secondary shadow VLR, wherein the secondary shadow VLR allows the IMSI to be identified based on the temporary identifier such as the TMSI. In step S43, the response is transmitted back to MSC4 comprising the requested IMSI. Furthermore, the MME/SGSN address may be in addition provided with the IMSI in the response S43.

Now knowing the IMSI of the subscriber performing the originating transaction, the MSC4 registers as the new serving MSC for the subscriber by sending an update location request in step S44 to the HLR. In this respect, a new TMSI is allocated for the subscriber after the transaction is finished. The HLR provides subscriber data by sending an "Insert Subscriber Data" message to the MSC4 (step S45) and the MME identification is appended to the new subscriber profile created in the VLR, the two response messages S46 and S46a being exchanged in response to message S44 and S45. The call setup can continue with MSC4 receiving the setup message in step S47 and in step S48 a message is sent in direction to the remote end (ext). The reallocation command messages S18 and S19 between MSC4 and RNC/BSC corresponds to steps S18 and S19 of FIGS. 8 and 9, and the shadow delete message S11 corresponds to message S11 of FIG. 9. The secondary shadow VLR in MSC3 is updated in step S49 with the new TMSI and an update message is sent to MSC5 in step S50 where the primary shadow VLR for MSC4 is located, steps S51 and S52 being the corresponding response messages. In the moment when the UE is officially relocated to MSC4, the primary and secondary shadow VLRs corresponding to the MSC4 and the new TMSI will need to receive the new information, i.e. their content is updated with the new information, while the relevant information in the old primary and secondary shadow VLRs can be removed, which can be seen also as content update. The location of the secondary shadow VLR may change due to the new TMSI which leads to a new hash value. Therefore, it may be necessary to delete the old secondary shadow entry in MSC3 and store a new secondary shadow VLR entry in another MSC (not shown).

Figure 11:
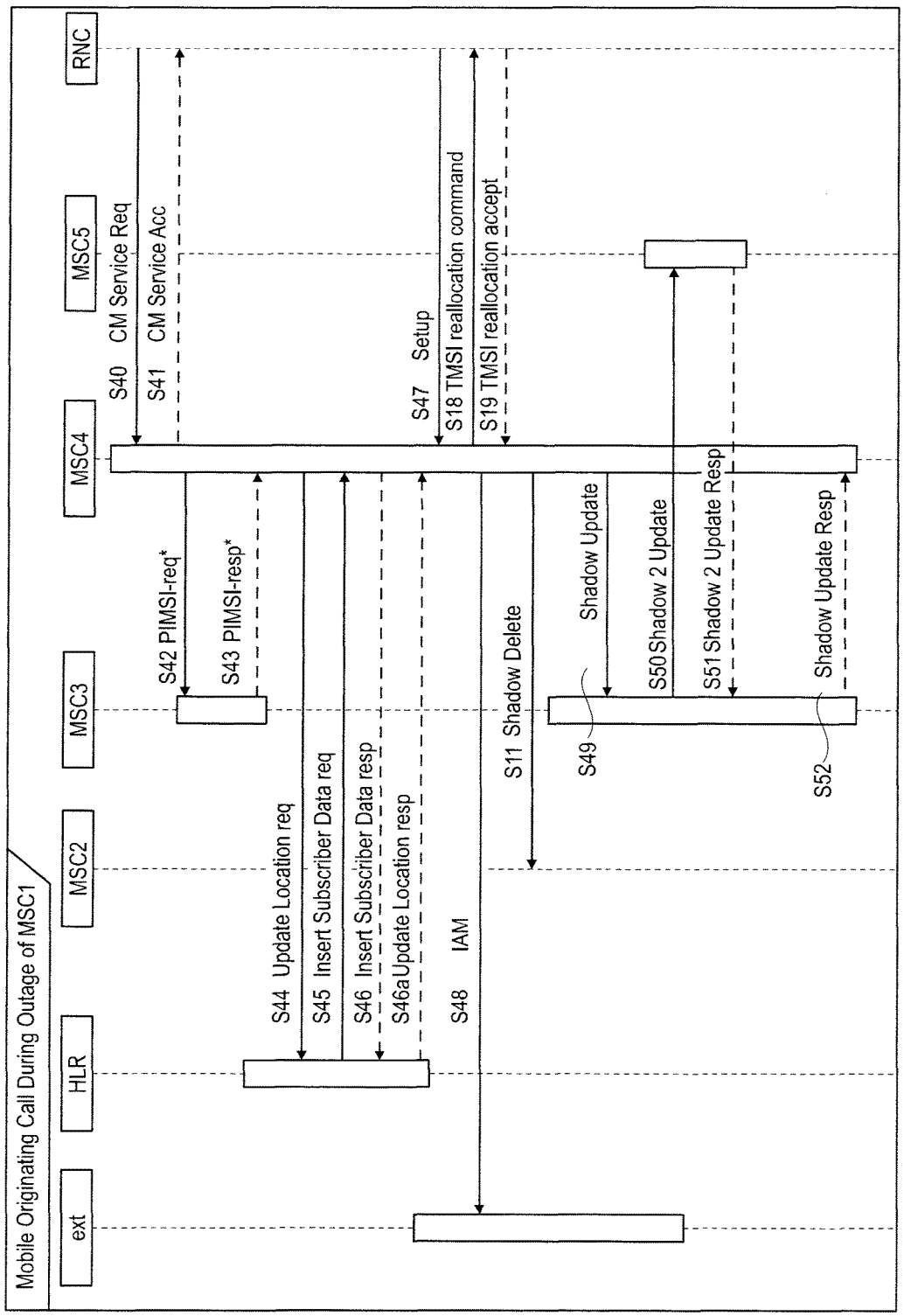
FIG. 11 illustrates an example of a message flow for a mobile entity originating call during an outage of one MSC or pool of MSCs and how the call is saved.

From the above discussion of FIG. 11 it can be deduced that the first originating call attempt of a UE after the outage of a serving MSC (here MSC1) will be successful and the UE will be served by a new MSC4. Additionally, the security is increased as the IMSI is not transmitted over the air interface.

Figure 12:
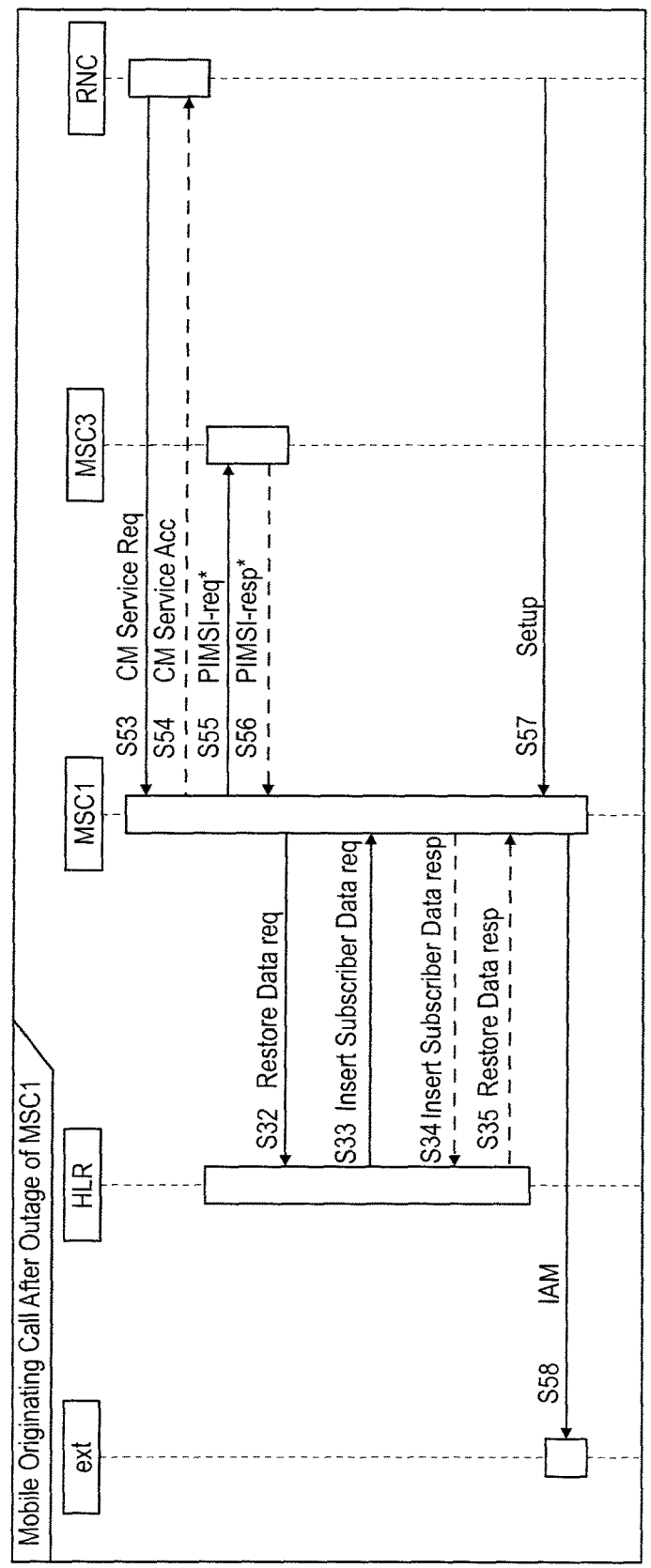
FIG. 12 illustrates an example of a message flow for a mobile originating call after the outage of one MSC of a pool of MSCs and how the call is saved.

In connection with FIG. 12, an example of a GSM or WCDMA originating call setup is discussed after a recovery of pooled MSC1. The serving MSC1 receives a transaction with TMSI from the UE because the NRI is still valid (steps S53 and S54). These steps correspond to steps S40 and S41 of FIG. 11 with the exception that MSC1 is involved instead of MSC4. MSC1 does not have the subscriber data any more, but identifies where the secondary shadow VLR is located, e.g. by hashing on TMSI and sends a request to MSC3, where for example the secondary shadow VLR is located asking for the IMSI for the received TMSI (step S55). The secondary shadow VLR provides the IMSI and optionally the MME/SGSN address extracted from the secondary shadow VLR in step S56. In the example of FIG. 12, no data from the primary shadow VLR is needed. The MSC1 uses a "Restore Data" message towards the HLR to recover subscriber data from the HLR as known from steps S32 to S35 of FIG. 10. A setup request is sent to MSC1 in step S57 and, since the MSC1 possess now the necessary subscriber data, MSC1 transmits an Initial Address Message IAM towards the remote end (ext) in step S58 in order to set up the call.

From the above discussion of FIG. 12 it can be deduced that the first originating call attempt of a UE after the recovery of an outage of a serving MSC (here MSC1) will be successful and the UE will be continued to be served by MSC1. In addition with the present embodiment a more even load distribution between the pool members is achieved, since the UE is continued to be served by the recovered MSC1 and not assigned to a different MSC from the pool like it could happen in the earlier solution (which would then mean further increasing the load of the other pool members while "decreasing" the load of the recovered MSC1). Security is again increased as IMSI is not handled over the air interface.

In the following, the updating of the different shadow VLRs is discussed in more detail. Whenever a new TMSI is allocated for a UE, the new serving MSC should send update notifications to the previous (the one from the failed MSC)

and his own primary shadow VLR. The primary shadow VLR of the new MSC may then relay the message further to the old and new secondary shadow VLRs. The primary shadow VLR of the new MSC is updated with TMSI, LAI and optionally MME/SGSN address whenever any of these values change while the entry in the previous primary shadow VLR is deleted. In a similar manner the related entry in the previous secondary shadow VLR needs to be deleted and a new entry in the new secondary shadow VLR is created if the TMSI has changed. A separate message is needed if change of the TMSI leads to identification of a different MSC by means of the TMSI based hashing. The secondary VLR may be also updated if the MME/SGSN address is changed.

Figure 13:
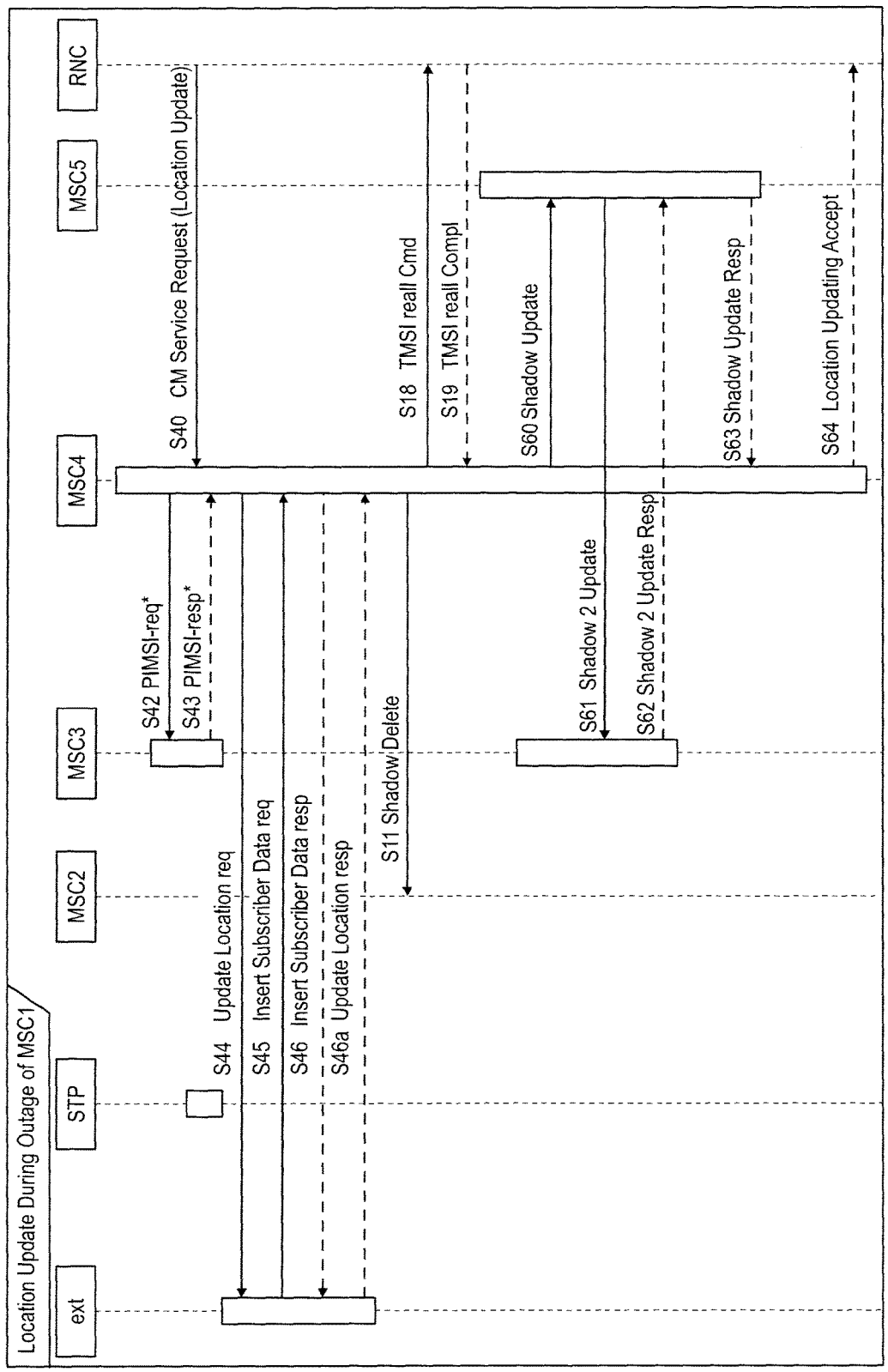
FIG. 13 illustrates an example of a message flow how a storage unit used in some of the message flows above is updated, especially how a location update is carried out during the outage of one MSC.

In connection with FIG. 13, an example of a location update during an outage of MSC1 is discussed.

A location update of a subscriber that was served by an MSC (MSC1) that is down leads to a redistribution of the subscriber to one of the other pool members. In FIG. 13 in step S40, a connection management service request (location update) is received by MSC4 as known from step S40 of FIG. 11. Furthermore, steps S42 to S46a and S11 are known from FIG. 11. The TMSI reallocation command sent to RNC and the corresponding accept message are known from FIG. 8 and also steps S18 and S19. An update message for updating the primary shadow VLR of MSC4 is sent in step S60 to MSC5, which then informs the secondary shadow VLR of the update in step S61 and the old secondary shadow VLR is deleted together with the entry in the corresponding old primary shadow VLR, the response signal being sent back in step S62. Furthermore, in step S63, the Shadow Update Response message may be transmitted back to MSC5 as response to step S60. In step S64, a Locating Updating Accept message is transmitted back to RNC. Due to the new TMSI, the secondary shadow VLR for the UE may stay at MSC3 or may be shifted to another MSC, such as a further MSC6 not shown in FIG. 13. The hashing on the new TMSI may point to a different location for the secondary shadow VLR. This new location could be the other MSC6 that contains the secondary shadow VLR for the new TMSI, however, MSC3 could also be a possible destination for the secondary shadow VLR corresponding to the new TMSI.

Figure 14:
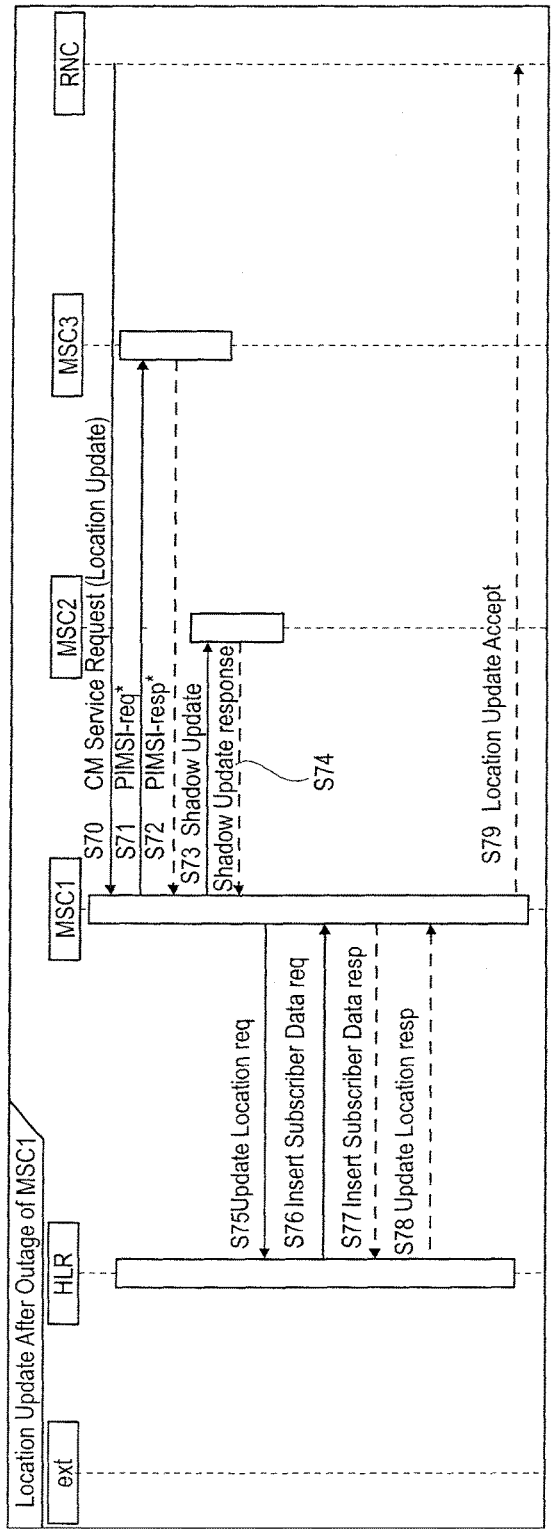
FIG. 14 shows an example message flow of a location update after the outage of one MSC of a pool of MSCs.

In connection with FIG. 14, an example of a location update after outage of MSC1 will be discussed. A location update of a subscriber that was served by an MSC (MSC1) that has recovered, does not lead to a redistribution of the subscriber to any other pool member. Instead, it triggers a restoration of the subscriber data in the same MSC that served the subscriber before the disturbance.

In step S70, the CM Service request is received by MSC1. As the TMSI included in the request is not known, the secondary shadow VLR is accessed to request the IMSI based on the received TMSI (steps S71 and S72). In step S73, an update of the primary shadow VLR provided on MSC2 is sent with the response message being received from MSC1 in step S74. The MSC then registers as serving MSC by sending the Update Location to the HLR in steps S75 to S78, which correspond to steps S44 to S46a of FIG. 13 with the difference that the message is originating from MSC1. In step S79, a Location Update Accept is sent back to the RNC.

Figure 15:
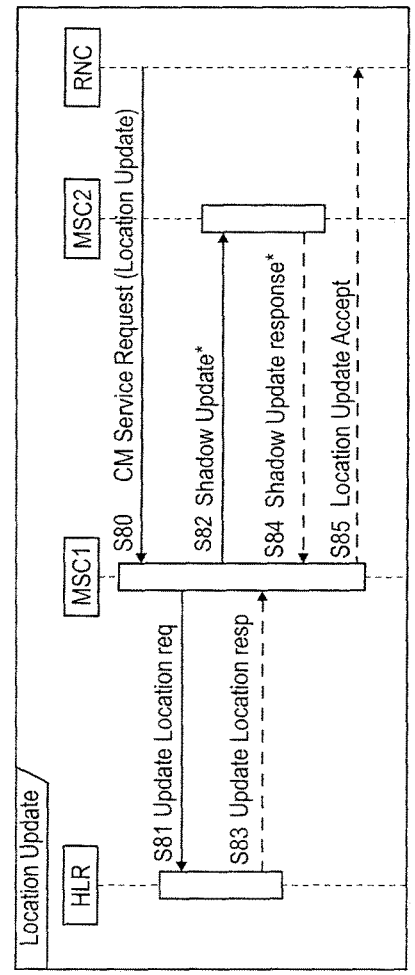
FIG. 15 shows an example location update during normal operation and how a database involved in the message flows above is updated.

In connection with FIG. 15, an example of a location update during normal operation will be discussed.

During normal operation, the location update contains IMSI or TMSI that is known to the receiving MSC1. The primary shadow VLR needs to be updated with the new LAI.

In step S80, the MSC1 receives the CM Service request with an Update Location request being sent to the HLR in step S81 informing the HLR that it will take over the corresponding call. In step S82, the primary shadow VLR is updated with the new LAI. Step S83 relates to the Update Location response from the HLR to the MSC1 and step S84 is the response message to the Update message of step S82. Last but not least, in step S85, the Location Update Accept message is transmitted to the RNC.

As described above, one possibility to determine the location of the different shadow VLRs, for example the secondary shadow VLR, is the use of a hashing function. Hashing is a known mathematical function to map data from a large data set to a small data set. In the present embodiment, the small data set is the set of pooled MSCs excluding one MSC. The excluded MSC is the one that failed. In the present application, the network node that performs the hashing knows the identity of the failed MSC: The node that according to the invention needs to map the TMSI to IMSI can assume that the TMSI has been assigned by a failed MSC and that the NRI within the TMSI points to the failed MSC.

Figure 16A:
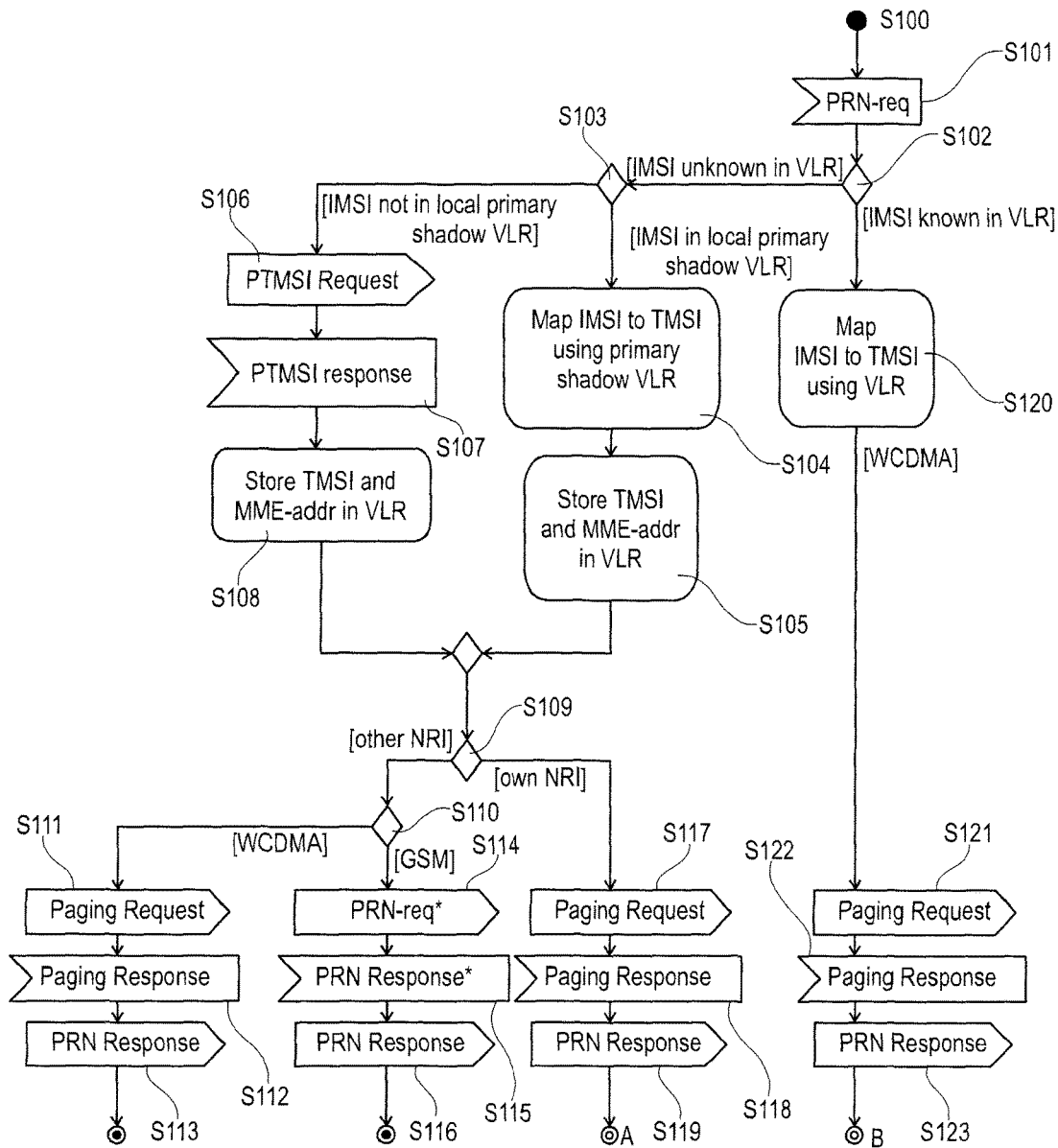
FIGS. 16a and 16b show an example flow chart of a method carried out with the MSC receiving a "Provide Roaming Number" message.
Figure 16B:
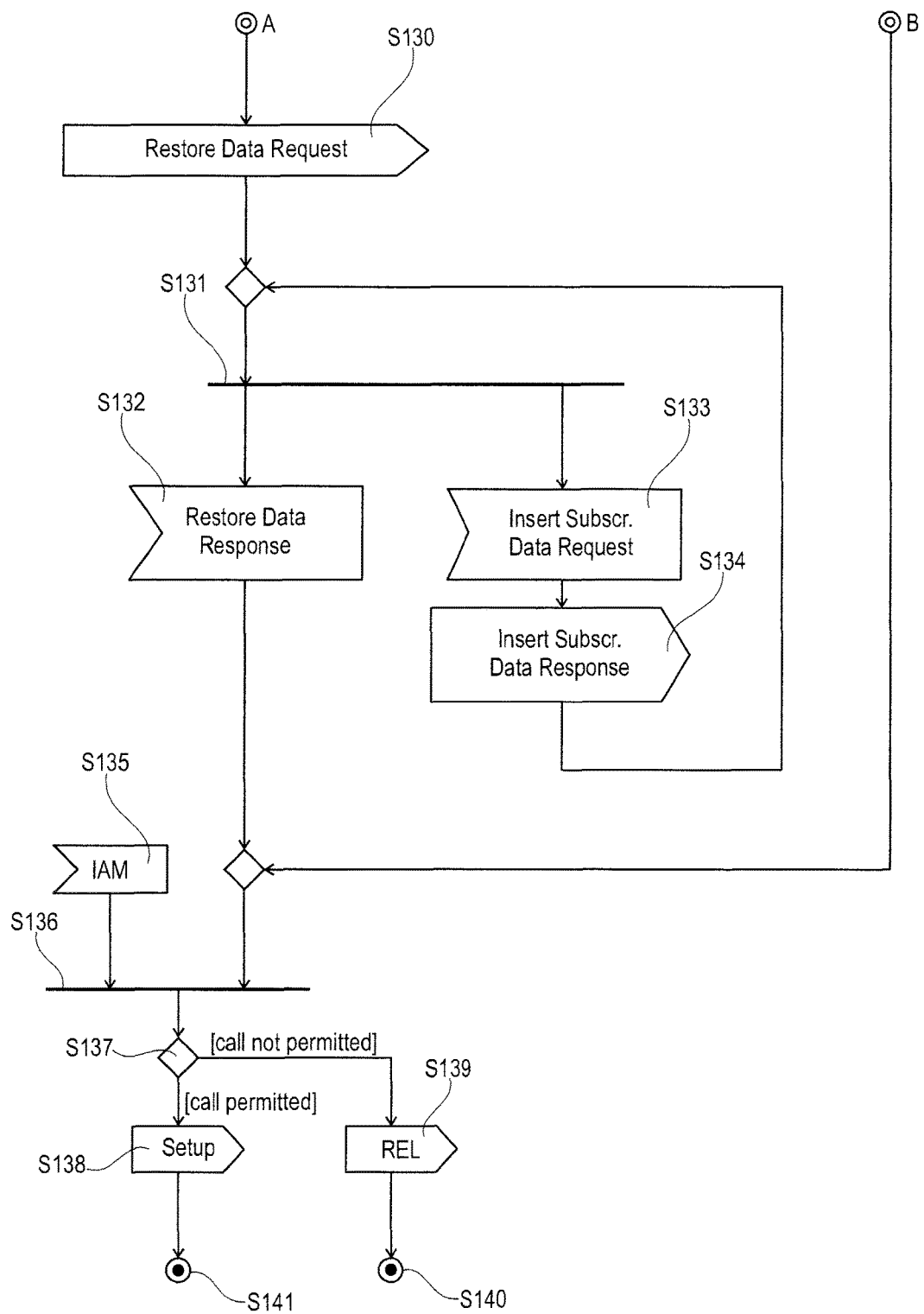

In connection with FIGS. 16a and 16b, the steps carried out at an MSC which receives a Provide Roaming Number message is explained in more detail. By way of example, it is MSC2 in the embodiments of FIGS. 8 and 9, or MSC1 in the embodiment of FIG. 10. The method starts in step S100 and in step S101 the PRN message is received. In the embodiments of FIGS. 16 to 23, a reception of a message is indicated as in step S101 by an arrow on the left side, wherein a message sent out is symbolized by an arrow on the right side. In step S102, it is checked within the MSC whether the IMSI is known in the VLR or not. If this is not the case, it is checked in the next step S103, whether the IMSI received in step S101 is contained in the local primary shadow VLR. If this is the case, the IMSI is mapped to the TMSI using the primary shadow VLR in step S104 and the TMSI, last known LAI and the MME address is stored in the VLR in step S105. If the answer of step S103 is negative, the request message to retrieve the TMSI is sent to the primary shadow VLR in step S106 with the requested TMSI being received in the response message in step S107. The TMSI, LAI and the MME address are stored in the VLR in step S108. In step S109, it is then checked whether the NRI contained in the paging response is the own NRI or another NRI. If it is another NRI, the further method depends on the fact whether it is a WCDMA application or GSM application. In the case of a WCDMA application, a paging request, as inter alia shown by step S5 of FIG. 8, is transmitted to the RNC, the MSC receiving a paging response in step S112. Finally, in step S113 the PRN response, in response to the PRN request, can be sent back in direction of the HLR. If the decision of step S110 is that it is a GSM case, the modified PRN request is transmitted in step S114 as shown in connection with FIG. 9 in step S24. The modified PRN response is received in step S115 and the PRN response is forwarded in direction of the HLR in step S116.

If it is the own NRI, the paging request can be sent to the BSC/RNC with the paging response being received in step S118, wherein the PRN response is again transmitted back in direction of the HLR.

Referring back to step S102, if the IMSI is known in the VLR, the IMSI is mapped to the TMSI using the VLR in step S120. Furthermore, the paging request is sent to the RNC in step S121, as shown inter alia in FIG. 8, with the paging response being received in step S122. Furthermore, the PRN response is transmitted back in direction of the HLR in step S123.

The method then continues in FIG. 16b. After step S119 of FIG. 16a, the method continues at A and the Restore Data request is sent to the HLR. After this message and when the Insert Subscriber Data request has been received from the HLR in step S133 with a response being transmitted back in step S134, an Restore Data response as shown by step S35 of FIG. 10 is received in step S132. Furthermore, the IAM message is received in step S135 and, if this condition is met in step S136 together with the received Restore Data response of step S132 or the PRN response at B of FIG. 16a, it is checked in step S137 whether the call is permitted or not. If the call is permitted, the call is set up and the setup message is transmitted to the RNC/BSC (step S138). If the call is not permitted, the Release message is transmitted in step S139 to the RNC/BSC. After step S139, the method ends in step S140, whereas the method ends after step S138 in step S141.

Figure 17A:
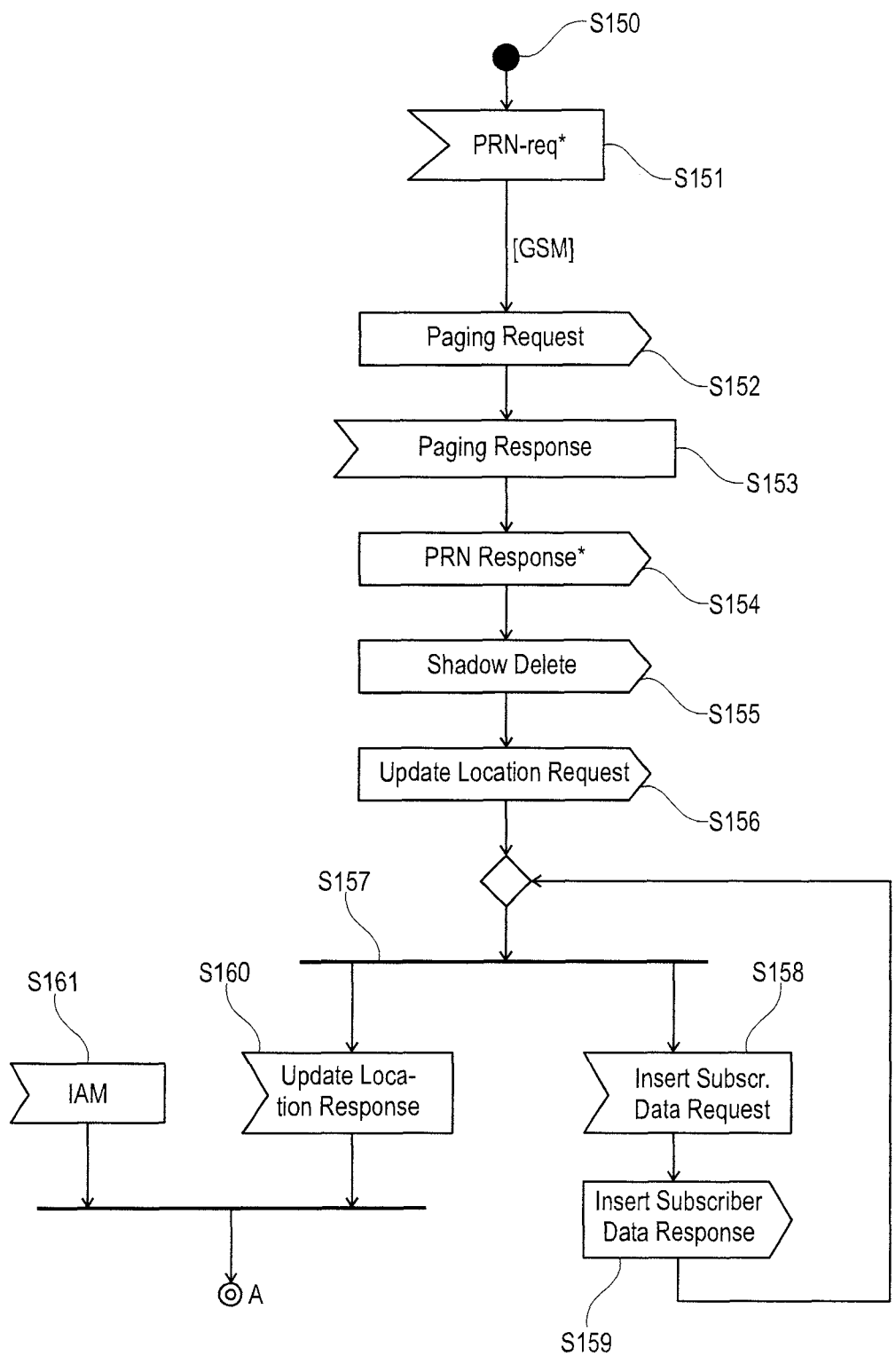
FIGS. 17a and 17b show an example flow chart of a method carried out with the MSC receiving a modified PRN request from another MSC.
Figure 17B:
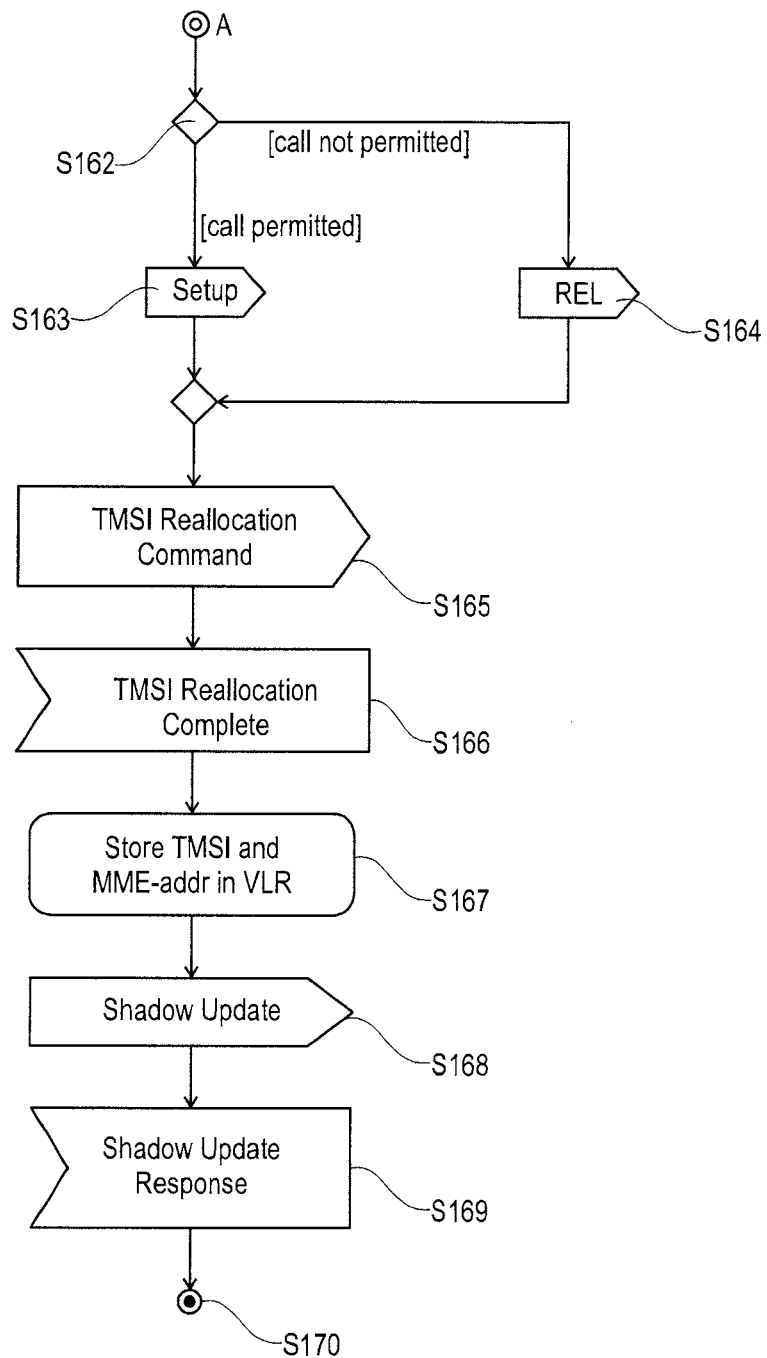

In connection with FIGS. 17a and 17b the steps carried out at an MSC receiving a modified PRN request from another MSC are discussed. The modified PRN request contains additionally the TMSI. The method starts in step S150. In step S151, a modified PRN request is received from another MSC. By way of example, as discussed above in connection with FIG. 9, MSC4 receives the PRN request from MSC2. In step S152, a paging request is transmitted to the corresponding BSC with a paging response being received in step S153. In step S154, the modified PRN response can be transmitted back to the MSC from where message S151 was received. The paging response furthermore contains a temporarily assigned roaming number (for example the MSRN). As also discussed in connection with FIG. 9, the Shadow Delete message is transmitted to the other MSC in order to delete the entry from the primary shadow VLR (S155). In step S156, an Update Location request is transmitted to the HLR as also shown in FIG. 9. After this message and when the Insert Subscriber Data request has been received from the HLR in step S158 with a response being transmitted back in step S159, an Update Location response as shown by step S15 of FIG. 9 is received in step S160. Further, the IAM request is received in step S161 from the GMSC.

The method then continues in FIG. 17b. It is checked in step S162 whether the call is permitted or not. If the call is permitted, a setup message is transmitted to the corresponding BSC in step S163, whereas, if the call is not permitted, a Release message is transmitted in step S164 to the corresponding BSC. As a next step, a TMSI reallocation command is transmitted in step S165 to the BSC with the TMSI Reallocation Complete message being received in step S166. The TMSI and the MME address are stored in the VLR in step S167 and a Shadow Update message is transmitted in step S168 to the primary shadow VLR with the shadow update response being received in step S169. The method ends in step S170.

Figure 18A:
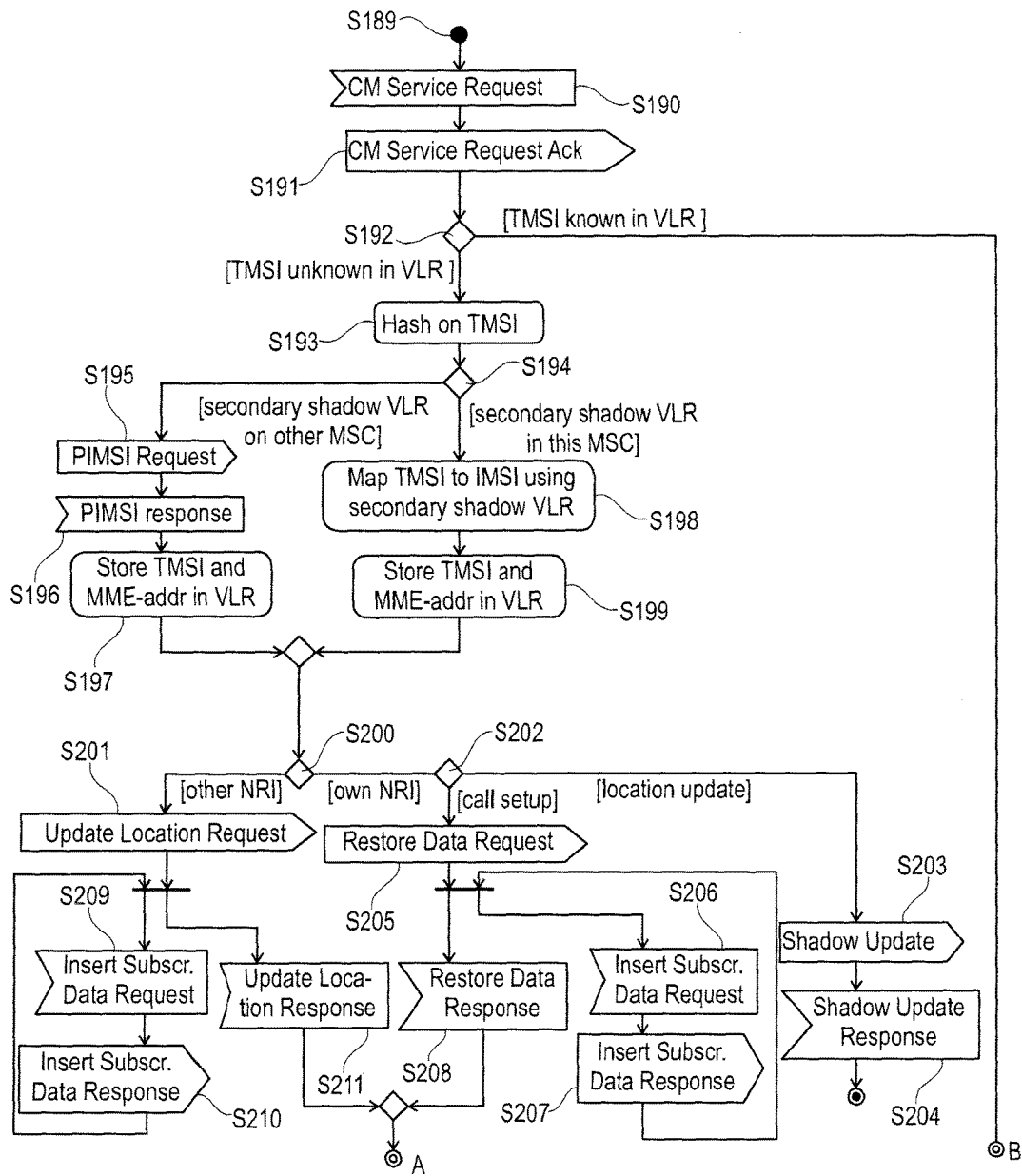
FIGS. 18a and 18b show an example flowchart of a method receiving a connection management service request.
Figure 18B:
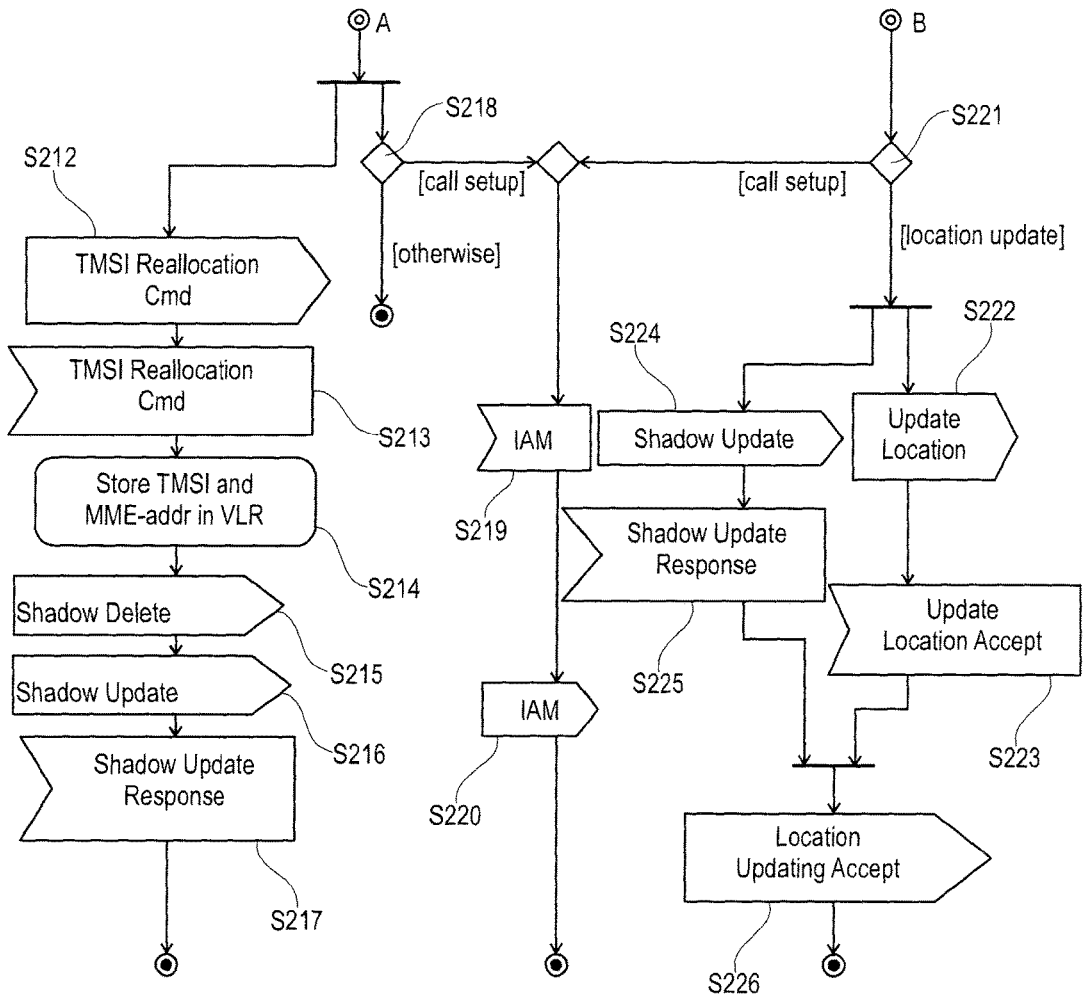

In connection with FIGS. 18a and 18b, the steps carried by an MSC receiving a connection management service request are discussed. As it is the case for MSC4 in FIG. 11, MSC1 of FIG. 12, MSC4 of FIG. 13, and MSC1 of FIG. 14 or 15, the method starts in step S189 and the service request is received in step S190 from the RNC, an acknowledgment message being sent back in step S191. The following steps now depend on the fact whether the MSC knows the temporary identifier or not. Thus, it is checked in step S192 whether the TMSI is known or not. If this is not the case, the TMSI being unknown, the secondary shadow VLR has to be identified, which is done in step S193 by hashing on the TMSI. In step S194, it is then checked whether the secondary shadow VLR is on the same MSC or a different MSC. In step S195, a new request to provide the IMSI is sent to the secondary shadow VLR, with a response being received in step S196. In step S197, the TMSI and, optionally the MME address are stored in the VLR. If the secondary shadow VLR is in the present MSC, the TMSI is mapped to the IMSI using the secondary shadow VLR (S198) and the TMSI and optionally the MME address are stored in the VLR (step S199). In step S200, it is then checked whether the NRI is another NRI than its own. If it is another NRI, the Update Location request is transmitted in step S201, and if it is the own NRI, it is checked in step S202 whether it is a location update or a call setup. If it is a location update, the primary shadow VLR is updated in step S203 with the response message received in step S204. If it is a call setup, a Restore Data request is transmitted in step S205 to the HLR as shown in FIG. 12 step S32. When Insert Subscriber Data request is received from the HLR in step S206 with the response being transmitted back in step S207, the Restore Data response is received from the HLR in step S208. Furthermore, with the Insert Subscriber Data request being received in step S209, with the response message being transmitted back in step S210, the Update Location response is received in step S211 as shown inter alia in FIG. 13 (step S46a). After step S211 or step S208, steps S212 to S217 are carried out. Furthermore, it is checked in step S218 whether it is a call setup or not. If not, the method ends, if yes, the IAM message is received in step S219 and the IAM message is transmitted in step S220 to the remote end. Referring back to step S192, if the TMSI is known in the VLR, it is checked in step S221 whether it is a call setup or a location update. In case of location update, the Update Location message is transmitted in step S222 with the Accept message being received in step S223. Furthermore, the shadow VLR is updated in step S224 with the response message being received in step S225. Last but not least, in step S226, the Location Update Accept message is transmitted.

Figure 19A:
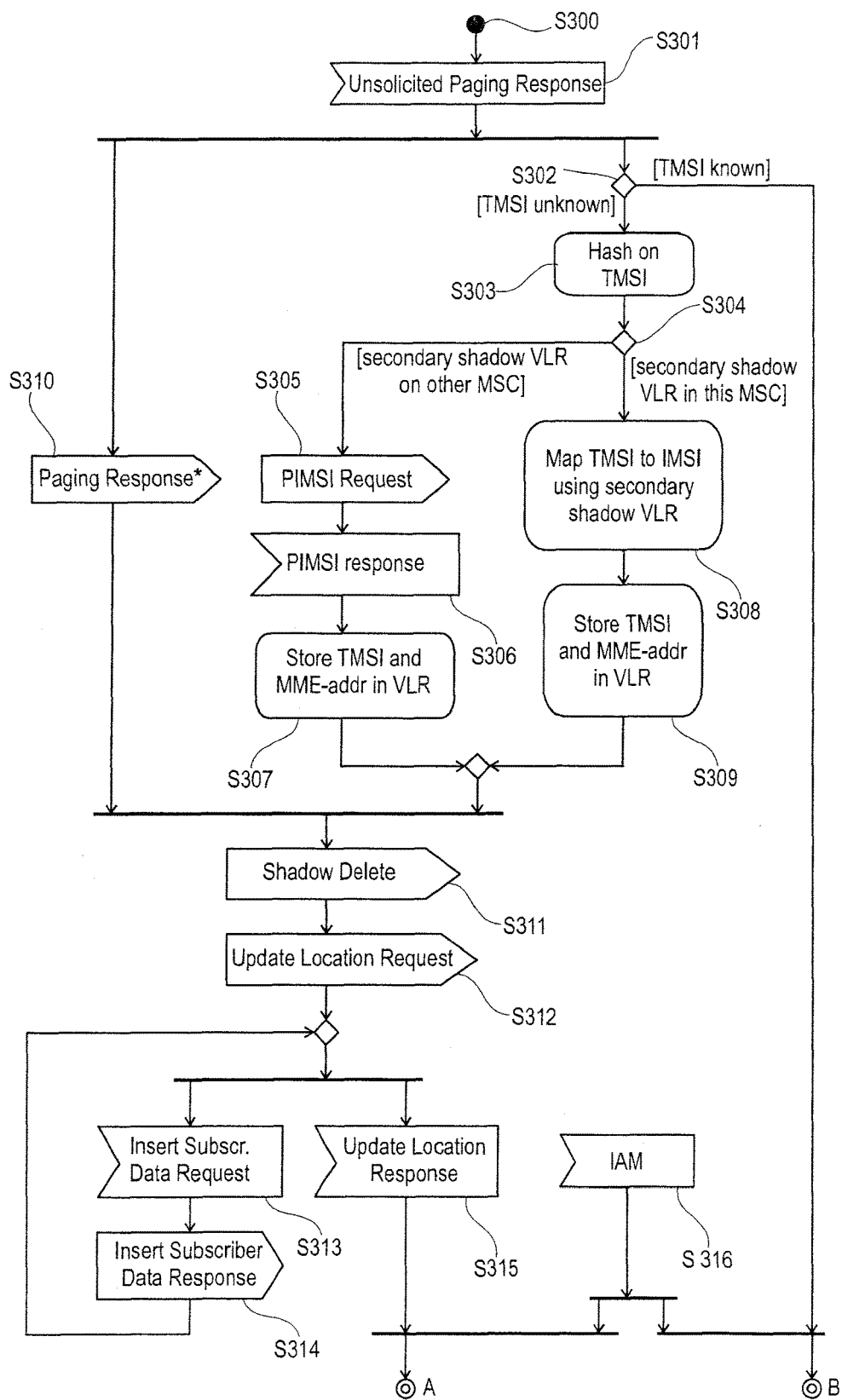
FIGS. 19a and 19b show an example flow chart of a method carried out with an MSC receiving an unsolicited paging response.
Figure 19B:
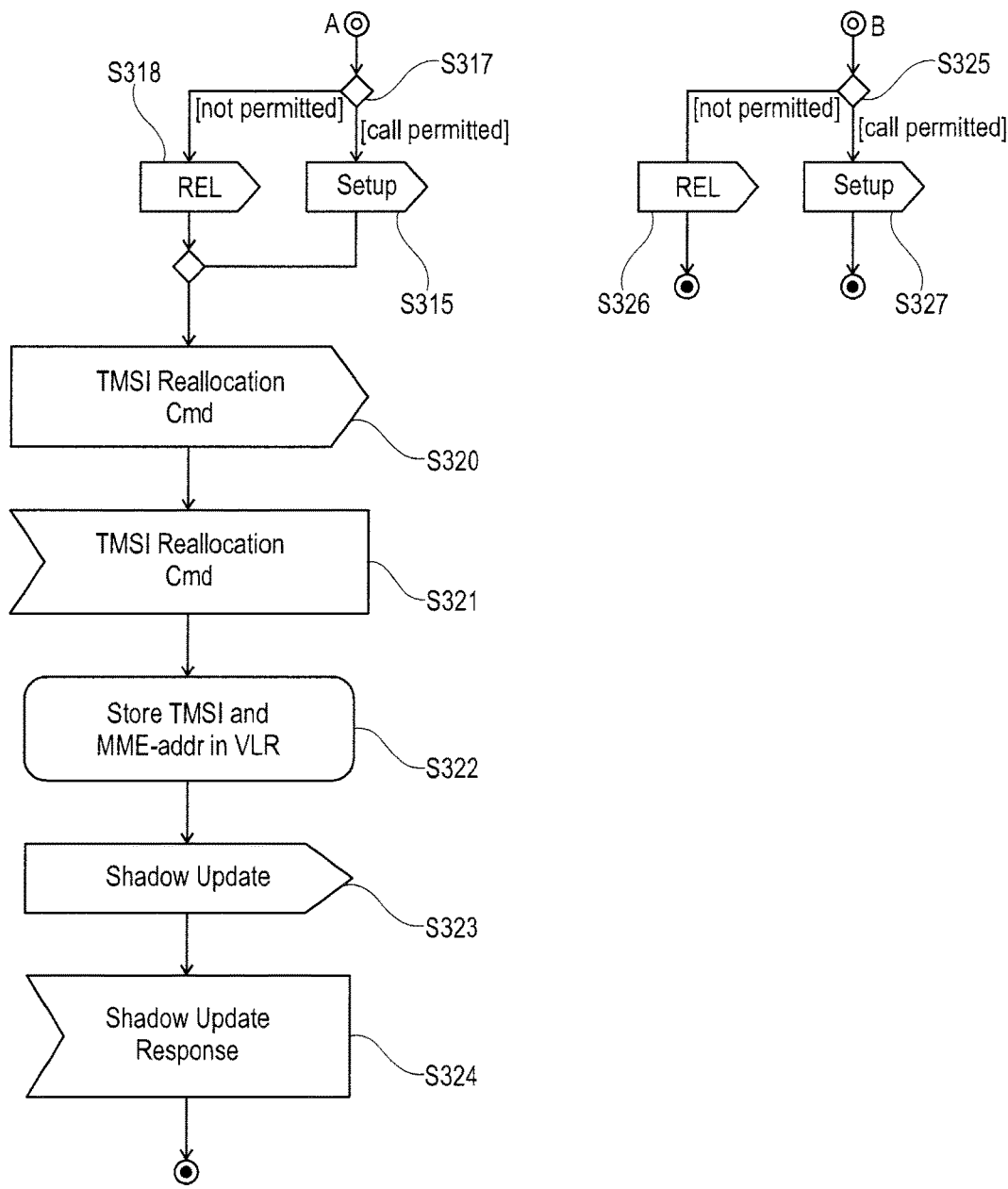

In FIGS. 19a and 19b, the steps carried out on an MSC receiving an unsolicited paging response are discussed. The method starts in step S300 and in step S301, the unsolicited paging response is received. In step S302, it is checked whether the TMSI is known or not. If the TMSI is not known, the location of the secondary shadow VRL has to be determined, here by step S303 by hashing on the TMSI. In step S304, it is then asked whether the secondary shadow is on the same MSC or on another MSC. If it is on another MSC, the MSC queries the secondary shadow VLR with a Provide IMSI message in step S305, the response being received from the secondary shadow VLR in step S306. The TMSI and the MME address are stored in the VLR in step S307. If the secondary shadow VLR is on the same MSC, the TMSI is mapped to the IMSI using the secondary shadow VLR in step S308, and the TMSI and the MME address are stored in the VLR in step S309.

Referring back to step S301, furthermore, a paging response is sent back to the received paging request in step S310. When these conditions are met, a Shadow Delete message is transmitted in step S311 to the MSC which maintains the primary shadow VLR in order to delete the entry from the primary shadow VLR, which is not needed any more. Furthermore, a Location Update request is transmitted to the HLR in step S312. If this condition is met, the Insert Subscriber Data request message is received from the HLR in step S313 with the response message being sent back in step S314. Furthermore, the Update Location response is transmitted back to the HLR in step S315 as a response to step S312. Furthermore, an initial setup message, such as an IAM message, is received in step S316.

The method continues in FIG. 19*b*, where the method continues at A after step S315. In step S317, it is asked whether the call is permitted or not. If the call is not permitted, a Release message is transmitted to the corresponding radio network node in step S318. If the call is permitted, the setup message is transmitted to the corresponding radio network node in step S319. Additionally, in step S320, the TMSI reallocation command is transmitted to the RNC with the response being received in step S321. In step S322, the TMSI and the MME address are stored in the VLR and a Shadow Delete message is transmitted in step S323 to remove the old entry with the response message being received in step S324. Referring to point B after S302 of FIG. 19*a*, the method continues at point B in FIG. 19*b*, where it is asked whether the call is permitted or not (step S325). As in steps S318 and S319, either a Release message or a setup message is transmitted to the corresponding RNC in steps S326 and S327, respectively.

In FIG. 20, the steps are disclosed carried out an MSC receiving a shadow update. The method starts in step S230. If the Update message requesting the update of the shadow VLR is received in step S231, the TMSI is stored in the primary shadow VLR in step S232. In the primary shadow VLR it is possible, when an IMSI is received, to determine the corresponding TMSI relating to the IMSI. In step S233, it is checked whether the TMSI has changed. If this is the case, the secondary shadow VLR has to be updated so that the Update message is sent to the secondary shadow VLR in step S234, the corresponding response message being received in step S235. Furthermore, a Delete message is sent to the old secondary shadow VLR in order to remove the old entry (steps S236). In step S237, the response message in response to the received message in step S231 can be transmitted back and the method ends in step S238. After step S236 the method ends at step S239.

FIG. 21 shows the steps carried out by an MSC containing the second storage unit which is used to determine an IMSI based on the TMSI. The method starts in step S240 with the Update message being received from the primary shadow VLR in step S241. In step S242, the IMSI is stored in the secondary shadow VLR in connection with the TMSI and a response message being sent back in step S243.

FIG. 22 shows the steps carried out by an MSC when it receives a message to delete a shadow database as discussed above in connection with FIG. 8. The method starts in step S250, wherein the Delete message is received in step S251. Accordingly, in step S252, the subscriber is deleted from the primary shadow VLR so that the method ends in step S253. FIG. 22 is also true for the corresponding message received for the secondary shadow VLR so that the same steps are carried out for the secondary VLR instead of the primary VLR.

Figure 23:
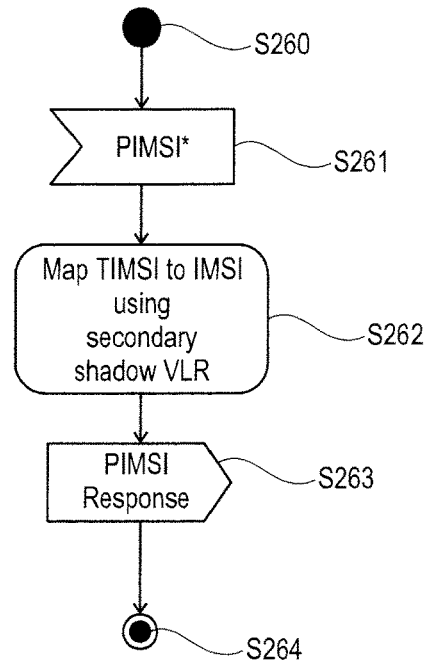
FIG. 23 illustrates an example flowchart comprising the steps carried out by an MSC receiving a preliminary unique identifier.

FIG. 23 shows the steps carried out by an MSC receiving a request to determine an IMSI based on a received TMSI. The method starts in step S260 and the request is received in step S261. In step S262, the received TMSI is mapped to an IMSI using the secondary shadow VLR and the IMSI as identified is transmitted back to the requesting entity in step S263. The method ends in step S264.

Figure 24:
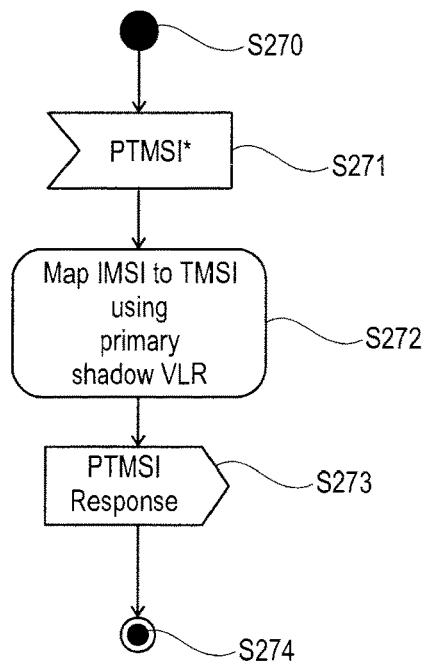
FIG. 24 shows an example flowchart comprising the steps carried by an MSC receiving a preliminary temporary mobile subscriber identity.

In FIG. 24, the method carried out by an MSC receiving a request for identifying a TMSI is discussed. The method starts in step S270, the message requesting a TMSI to be identified based on the IMSI is received in step S271. The IMSI is mapped to the TMSI using the primary shadow VLR in step S272 and the identified TMSI is transmitted back to the requesting node in step S273. The method ends in step S274.

Figure 25:
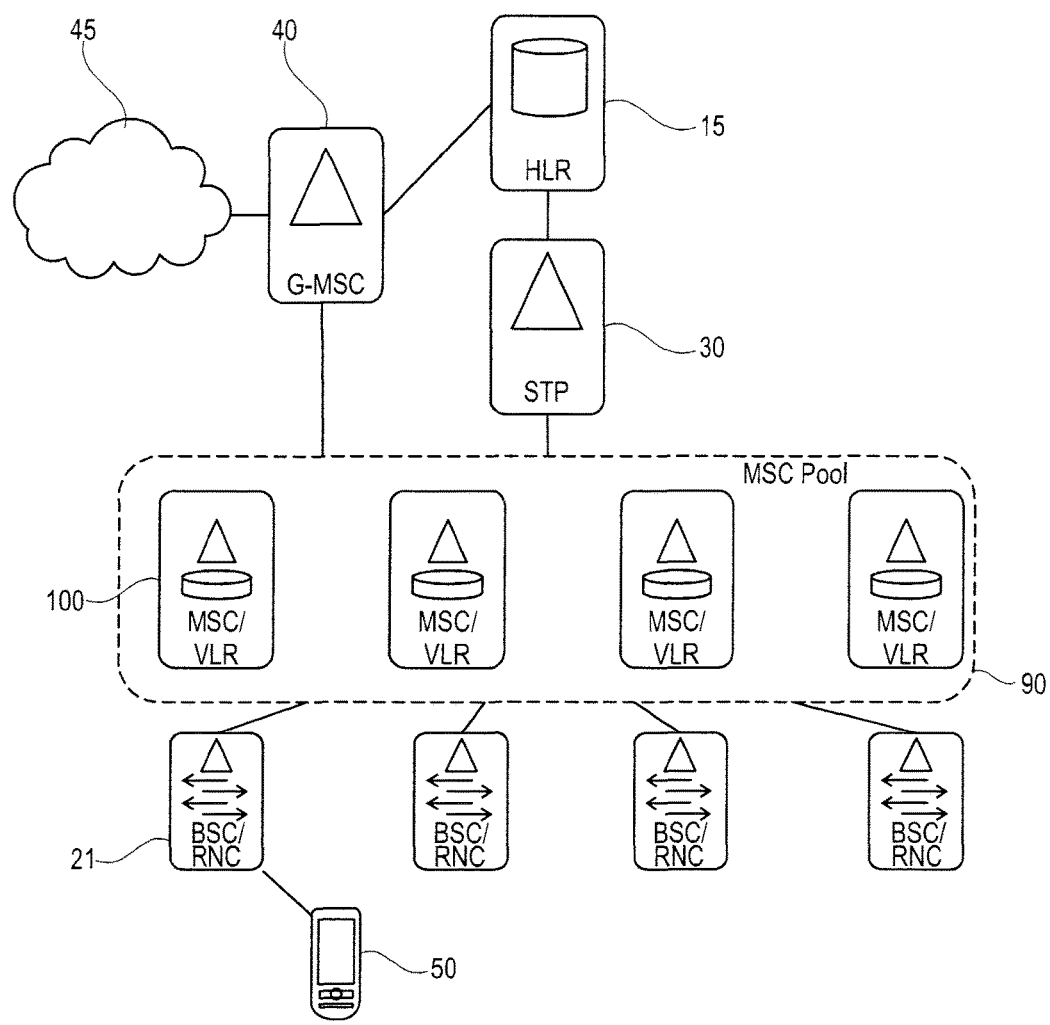
FIG. 25 illustrates an example architectural view of a network in which the invention can be applied.

FIG. 25 shows an overview over the network architecture in which the pooled MSCs with the corresponding shadow VLRs can be used. A pool 90 of the same type of mobility nodes, e.g. of different MSCs 100, is provided. The pool of MSCs shares a common set of radio network controllers 21, wherein the mobile entity 50 is connected to one of the radio network controllers. Furthermore, the Gateway MSC 40 is provided connected to HLR 15, the pool 90 and the network 45.

Figure 26:
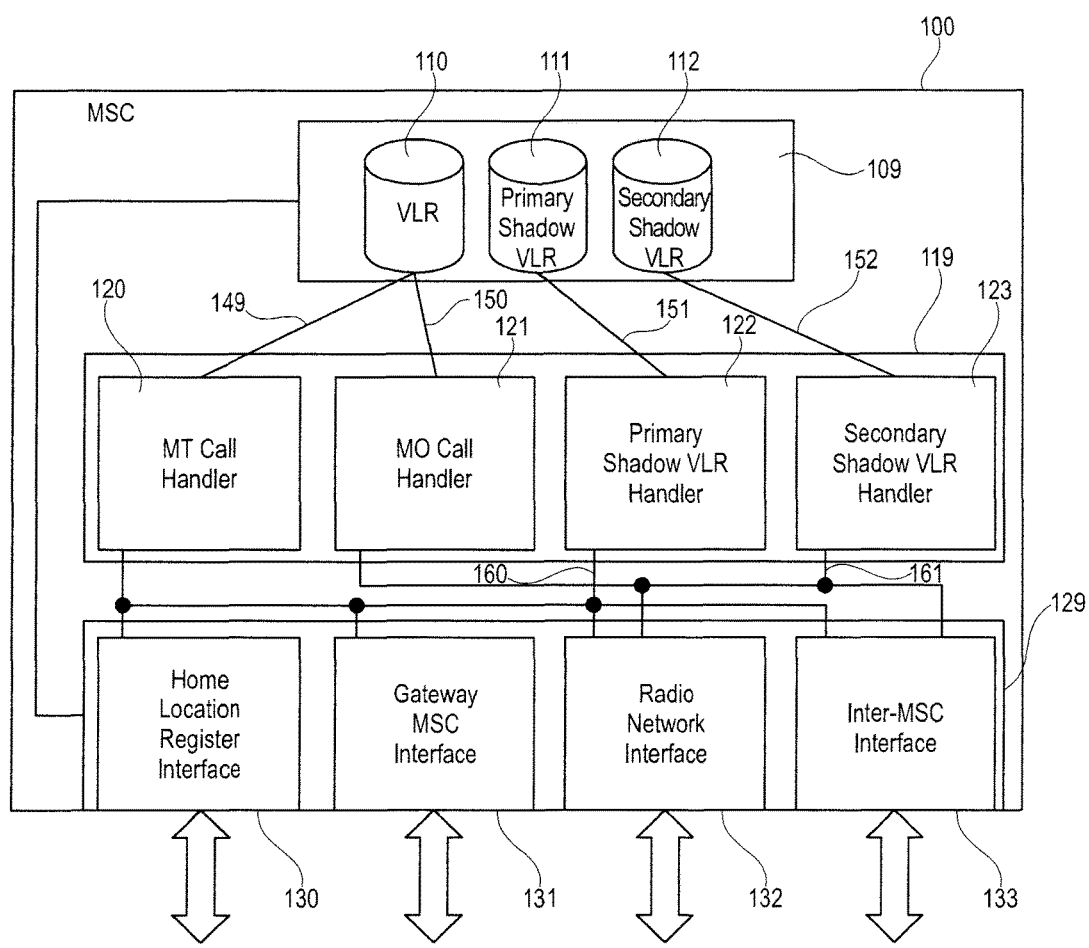
FIG. 26 is an example schematic representation of a mobility node including the two storage units which help to avoid that originating or terminating transactions fail due to a failure of one mobility node of a pool.

FIG. 26 shows a more detailed view of one of the MSCs comprising a primary shadow VLR 111 which can be used to identify a temporary identifier based on a unique identifier and a secondary shadow VLR 112 which may be used to determine a unique identifier based on a temporary identifier. The different VLRs 110-112 can be part of memory 109. Further the MSC 100 may comprise its own VLR 110. Furthermore, a mobile terminating call handler 120 is provided and a mobile originating call handler 121, which may be both connected via connections 149, 150 to VLR 110. A primary shadow VLR handling entity 122 may be connected via connection 151 to the primary shadow VLR and a secondary shadow VLR handling entity 123 may be connected to the secondary shadow VLR 112 via connection 152. The VLR, the primary shadow VLR and the secondary shadow VLR can be part of a memory 109. The different handling entities 120 to 123 can be part of a processing unit 119. Furthermore, an interface 129 is provided incorporating different interfaces used to communicate with the different involved nodes or entities such as for example the home location register interface 130, the gateway MSC interface 131, the radio network interface 132, and the inter-MSC interface 133.

The interface 129 can be utilized for sending control information or user data to other entities inside or outside the cellular network. Furthermore, the interface 129 can be used for internal communication, e.g. between the interface 129 and the storage unit 109, e.g. for accessing the primary shadow VLR such as between step S4 and S5 of FIG. 8 or for accessing the secondary shadow VLR if needed. Furthermore, processing unit 119 coupled to interface 129 and coupled to memory 109 is provided and comprises one or more processing units and is responsible for the operation of the corresponding MSC. The processing unit 119 can carry out the instructions stored in memory 109, wherein the memory may include a read-only memory, a random access memory, a mass storage or the like. The memory 109 can furthermore include a suitable configured program code to be executed by the processing unit 119 so as to implement the above described functionalities in which the MSC is involved. The primary shadow VLR 111 is provided to map from the IMSI to the TMSI, stores the IMSI, TMSI, LAI and MME address. Furthermore, the primary shadow VLR is provided for the matching of a roaming number from HLR. The MSC can furthermore keep in the secondary shadow VLR 112 a mapping which allows the determination of an IMSI based on a TMSI. Furthermore, the secondary shadow VLR may store the MME/SGSN address.

It is to be understood that the structures illustrated in FIGS. 24 and 25 are merely schematic and that the MSC may actually comprise further components, which, for the sake of clarity, have not been illustrated. Furthermore, it should be understood that the memory 109 may comprise further types of program codes.

As described above, the invention provides an apparatus such as an MSC 100, an SGSN or MME comprising a processing unit 119 and a memory 109, said memory containing instructions executable by the processing unit, whereby the apparatus is operative to carry out the different steps mentioned above, in which the apparatus such as the MSC 100 is involved. A message may be received for one of the mobile entities in which the mobile entity is identified by an unknown temporary identifier. Furthermore, the apparatus is operative to transmit an identification request to a storage unit storing information allowing the unique identifier to be determined based on a temporary identifier, wherein the identification request requests the unique identifier for said one mobile entity to be identified based on the unknown temporary identifier. Furthermore, it is operative to receive a response to the transmitted identification request, the response including information allowing the unique identifier related to the received unknown temporary identifier to be transmitted.

Furthermore, it is operative to transmit a reaction message reacting to the received message taking into account the unique identifier related to the unknown temporary identifier. The apparatus may furthermore comprise different modules to carry out the above discussed steps.

Furthermore, an apparatus is provided comprising means adapted to carry out the above-mentioned steps, such as to receive a message for one of the mobile entities, to transmit the identification request to the storage unit, to receive the response message, and to transmit a reaction message.

Figure 28:
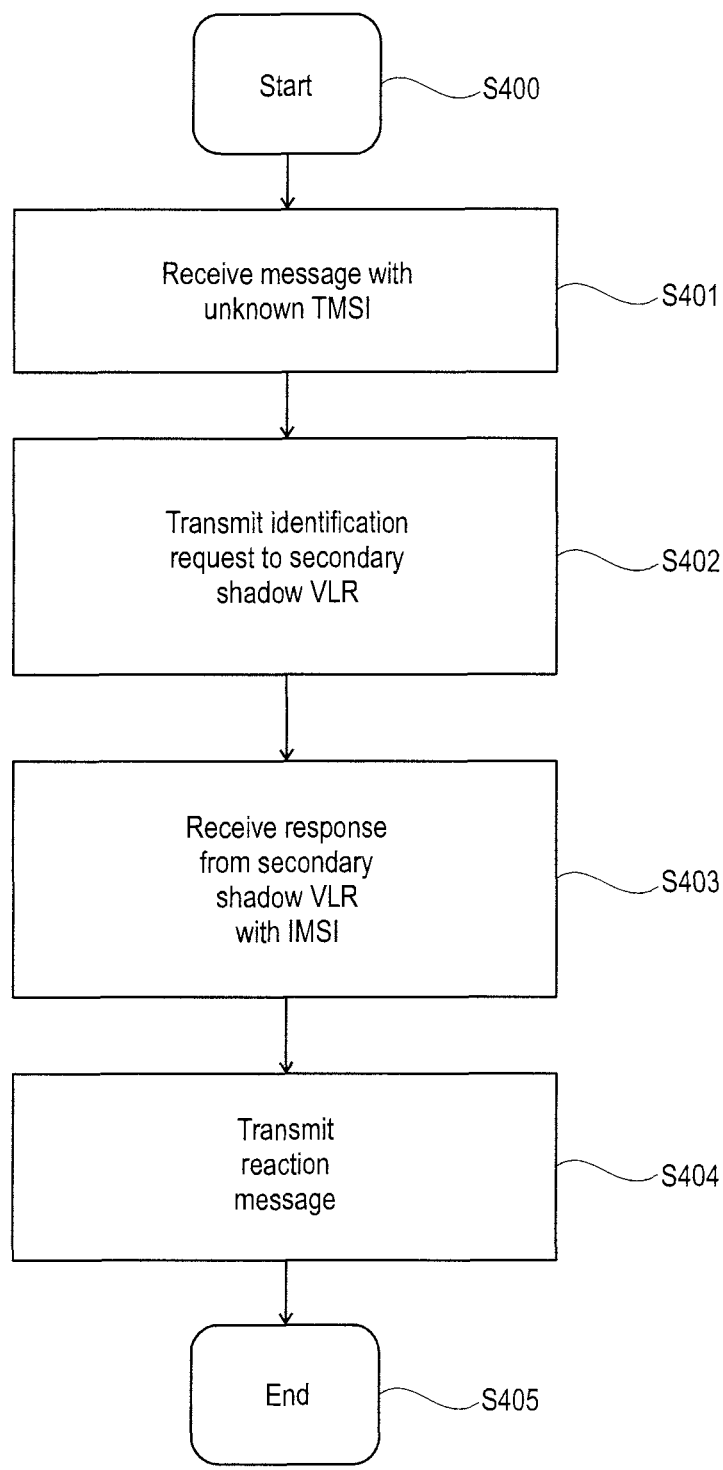
FIG. 28 illustrates an example flow chart comprising the steps carried out at an MSC as mobility node when a message is received in which a mobile entity is identified with an unknown temporary identifier.

FIG. 28 summarizes the steps carried out at a mobility node when a transaction related message is received in which the UE is identified with an unknown temporary identifier such as the TMSI. The method starts in step S400. In step S401, the message of one of the UEs is received in which the UE is identified by an unknown temporary identifier. In step S402, an identification request is transmitted to a storage unit, which stores the information allowing the unique identifier to be determined based on the temporary identifier, the storage unit being the secondary shadow VLR of the examples mentioned above. The identification request of step S402 requests that the unique identifier such as the IMSI is determined based on the TMSI received in step S401. In step S403, the response message is received form secondary shadow VLR including the unique identifier, here the IMSI. In step S404, a reaction message is transmitted. This reaction message depends on the nature of the received message of step S401. The transmission of the reaction message can include transmitting a request message to a subscriber database in which subscriber-related information of the UEs of the cellular network are stored, the request message requesting a location update for the UE for which the message is received or a restauration of subscriber data as shown in FIG. 12. A further option is forwarding an enhancement of the received message as a paging response message to another mobility node of the pool. The method ends in step S405.

Figure 29:
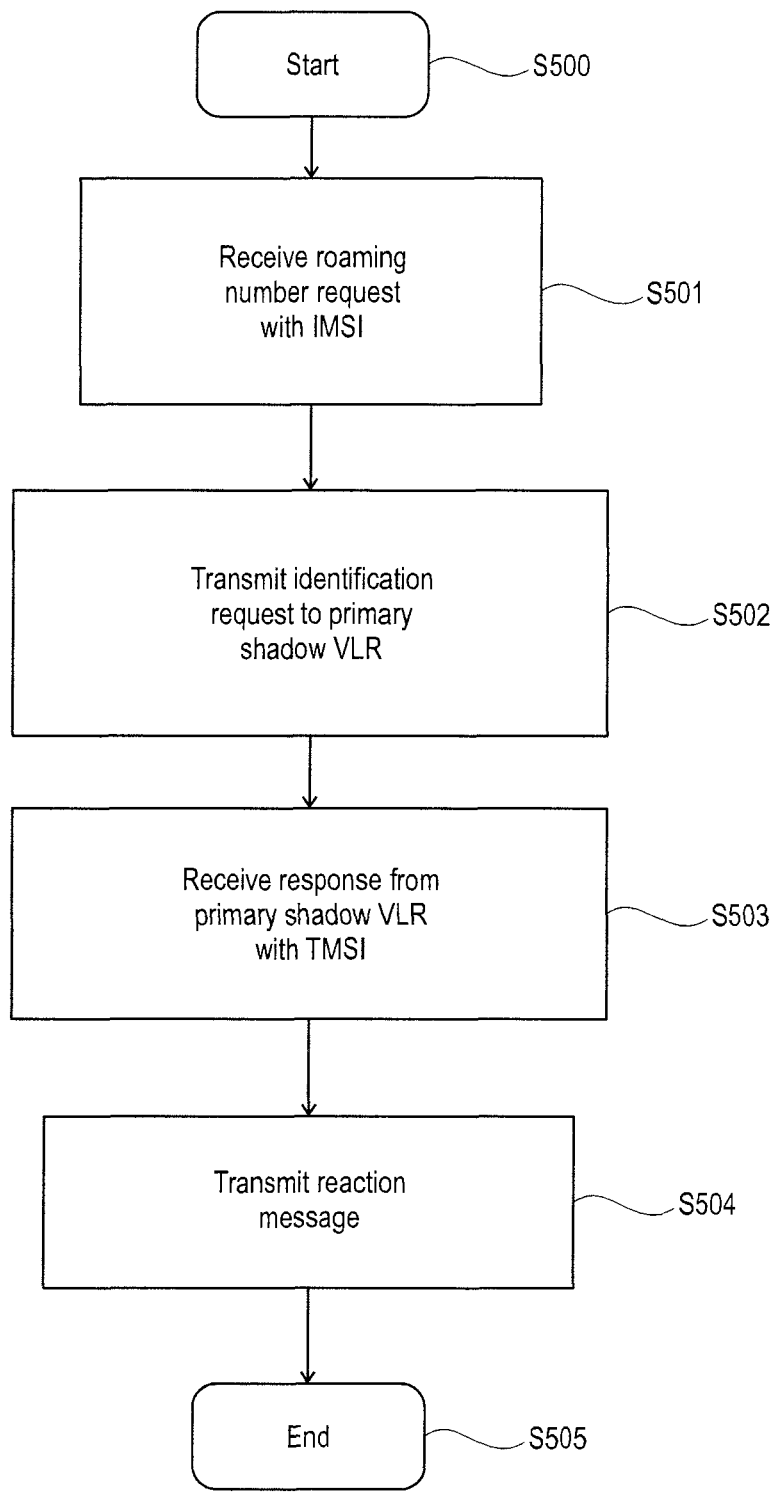
FIG. 29 illustrates an example flow chart comprising the steps carried out at an MSC as mobility node when a PRN request is received in which a mobile entity is identified with a unique identifier.

FIG. 29 summarizes the steps carried out at a mobility node when a message is received, such as a Provide Roaming Number message in which the mobile entity or UE is identified with the IMSI. The method starts in step S500, and in step S501, the Provide Roaming Number message is received for one of the UEs which is identified by the unique identifier, such as the IMSI. In step S502, an identification request is transmitted to the primary shadow VLR where the temporary identifier for the received unique identifier is stored. In step S503, the response is received from the primary shadow VLR with the temporary identifier, such as the TMSI. A reaction message is transmitted in step S504. Step S504 can include the step of forwarding the received Provide Roaming Number request to another mobility node of the pool or can comprise the step of transmitting a paging request to a control node controlling a radio network part of the cellular network. The method ends in step S505.

Furthermore, some general aspects may be deduced from the above discussion. The received message may be a paging response message relating to a transaction in the cellular network terminating at said one mobile entity 50. Furthermore, it can be a connection management service request message received from the UE carrying a location update or call setup request message. The transmitting of the reaction message can comprise the step of transmitting a request message to a subscriber database in which subscriber-related information of the mobile entity of the cellular network is stored, the request message requesting a location update for said one mobile entity. This was discussed above in connection with FIG. 8. The transmission of a reaction message can furthermore comprise the forwarding of the received paging response to another mobility node of the pool. The other mobility node may be identified by a network resource identifier, NRI or GUMMEI, received with the paging response message. The network resource identifier is an identifier which uniquely identifies an individual node in a pool of network nodes.

It is furthermore possible that the received message is a connection request relating to a transaction in the cellular network originating from the mobile entity, wherein the transmission of a reaction message comprises the step of transmitting a request message to a subscriber database in which subscriber-related information of the mobile entities of the cellular network is stored, the request message requesting subscriber data of the mobile entity based on the unique identifier of the mobile entity. Such an embodiment was discussed above in connection with FIG. 11.

Furthermore, the mobility node may determine where the storage unit, here the second storage unit or secondary shadow VLR is located. The identification request requesting the identification of the unique identifier is then transmitted to the determined storage unit.

The determination where the storage unit is located can be carried out using a function rule which, when applied to the unknown temporary identifier, determines at which of the mobility nodes of the pool the storage unit is located. The function rule can be a hash function, however, any other function might be used which enables the mapping of a large number of numbers to a smaller number of entities. Furthermore, the second storage unit may also be located at a fixed location and may be common for all available access types so that the hashing is not necessary.

Furthermore, the transmitted identification request can comprise a request for an address of a mobility node configured to manage a mobility of the mobile entities in the cellular network, the received response message furthermore comprising the requested address of the mobility node. As mentioned above, the second storage unit may also provide the identity of the MME/SGSN.

Furthermore, it is possible that an update information is received which contains at least one of a new temporary identifier for a unique identifier and an address of a mobility node configured to manage the mobility of the mobile entities in the cellular network.

The unique identifier can be an IMSI and the temporary identifier can be a TMSI and the subscriber database can be located in a VLR.

Furthermore, the permanent subscriber database can be located in a HLR.

Concerning the use of the first storage unit or the primary shadow VLR 111, a number request for a roaming number is received for one of the mobile entities which is identified based on the unique identifier. An identification request is then transmitted to this first storage unit or primary shadow VLR, the request requesting the temporary identifier to be identified based on the unique identifier. A response message is received including the requested temporary identifier and a reaction message reacting to the received number request is transmitted.

The transmission of the reaction message may comprise the step of forwarding the received number request comprising the temporary identifier of said one mobile entity to another mobility node of the pool.

The other mobility node of the pool to which the number request is forwarded can be selected in a random way or in a weighted way to distribute the load between the different mobility nodes.

As an alternative, the transmission of a reaction message may contain the step of transmitting a paging request to a control node controlling a radio network part of the cellular network. In this context, the received response from the storage unit can comprise a node identifier of a network node of the cellular network serving the pool of mobility nodes. It is then checked based on the node identifier whether the transaction was previously handled by said one mobility node, i.e. the mobility node that received the PRN from the HLR, and the paging request is transmitted to the control node controlling a radio network part of the cellular network in which said one mobility is node is located when it is determined that said one mobility node did not handle the transaction before.

In this embodiment a paging response may furthermore be received in response to the transmitted paging request and a number response is transmitted in response to the received number request to a subscriber database of the cellular network, wherein the number response comprises a temporarily assigned roaming number that was temporarily assigned to the transaction terminating at said one mobile entity.

Furthermore, it can be deduced that it may be decided to forward the received number request comprising the temporary identifier of said one mobile entity to another mobility node of the pool or to transmit a paging request to a control node controlling a radio network part of the cellular network in dependence of a section identifier received in the response to the transmitted identification request identifying the section of the cellular network.

In the above described application the terms "section", "common section" and "section identifier" are used. The "common section" is the whole area, such as the common section 22 of FIG. 1, served by a pool of mobility nodes. The term "section" indicates a subset, namely the section where the UE is located. For GSM and WCDMA the section would be the location area which is identified by the location area identifier, LAI, which then corresponds to the section identifier. For LTE, the section would be the transport area identified by a transport area identifier, TAI.

The invention furthermore provides the method for operating a pool of mobility nodes of the same type, wherein each mobility node of the pool has a first storage unit stored on another mobility node of the pool and each mobility node has a second storage unit distributed among the other mobility nodes of the pool. Additionally, it is possible to have a central primary or secondary storage unit for the complete pool or for a set of pools, independent of the access technology. Furthermore, the first storage unit and the second storage unit contain a partial copy of a location register or local subscriber database containing information about the mobile entities roaming within the common section served by the corresponding mobility nodes. The information may comprise transient data that cannot be fetched from the HLR, the temporary identifier(s) and the unique identifier of the UEs. The information comprises transient data that cannot be fetched from the HLR, the temporary identifier(s) and the unique identifier of the UEs.

In another embodiment, it is possible that one first storage unit and/or one second storage unit are/is provided for the whole pool or even for several pools independent of the access technology, covering a certain region of the cellular network. Furthermore, the storage unit can be unique per pool and per pool type. This means that one SGSN pool will have its own storage unit or one MME pool has another storage unit and MSC pool has its own storage unit. However, as mentioned above, there can also be a common storage unit that includes the mapping of all possible UEs' temporary identifiers (i.e. GUTI, P-TMSI, TMSI) and the UEs' unique identifier (i.e. IMSI) in an n-to-1 relationship.

As mentioned above, the mobility node comprises at least one processing unit and an interface. The at least one processing unit is configured to initiate the above mentioned steps, wherein the corresponding messages are received and transmitted via the interface.

Summarizing, the invention provides a reverse mapping from TMSI to IMSI performed by a mobility node such as an MSC that does not have the subscriber registered using a reverse lookup database, the secondary shadow VLR.

Furthermore, an on-the-fly transfer of registration of a UE during call setup or another interaction attempt during or after an availability of the pooled MSC is provided that was serving the subscriber before. This enables the transaction to be successful.

The above discussed solution has several advantages:

It is likely that short outages will increase when MSC network elements are deployed in virtualized data centers. These outages will, however, not cause any major imbalance in the pool. Furthermore, the imbalance will not further increase after recovery of a failed MSC. If the first transaction occurs after recovery of a failed MSC or MME/SGSN, then the subscriber continues to be served by that MSC or MME/SGSN. Subscribers that, after recovery of serving MSC, have the first network interaction since the beginning of the outage are not re-distributed among the pooled MSCs as it would be the case in existing solutions.

Originating call attempts that occur during and after the outage are handled successfully. No originating call attempts are rejected after the breakdown of a pooled MSC. This is achieved by having all data needed for a setup of calls retrievable at any time regardless if IMSI or TMSI is used as identification by the mobile entity.

Terminating call attempts that occur during the outage are successful. No terminating call attempts are rejected after the breakdown of a pooled MSC. This is achieved by having all data needed for a setup of calls retrievable at any time.

Furthermore, an improved privacy and security is provided as the IMSI is not sent over the air interface. Originating call attempts are no longer rejected and, therefore, the mobile entity is not forced to discard TMSI and does not need to provide IMSI for identification towards the network.

There is less load on the radio interface as no global paging is needed and the mobile entity is not forced to perform a location update.

The proposed changes are furthermore limited to the mobility nodes such as the MSC and SGSN-MME. A handling in other nodes of the in the network is not impacted.

The invention claimed is:

1. A method for operating a mobility node configured to track a mobility of a plurality of mobile entities in at least a section of a cellular network, in which a pool of mobility nodes serve a common section of the cellular network, wherein for each of the mobile entities a unique identifier is used in the cellular network to uniquely identify the corresponding mobile entity and a temporary identifier is used to identify the corresponding mobile entity in the at least one section of the cellular network, the method comprising for one of the mobility nodes of the pool:

receiving a message for one of the mobile entities in which the mobile entity is identified by an unknown temporary identifier, transmitting an identification request to a storage unit storing information allowing a unique identifier to be determined based on a temporary identifier, the identification request requesting the unique identifier for said one mobile entity to be identified based on the unknown temporary identifier, receiving a response to the transmitted identification request, the response comprising information allowing the unique identifier related to the received unknown temporary identifier to be determined, transmitting a reaction message reacting to the received message taking into account the unique identifier related to the unknown temporary identifier, determining where the storage unit is located, wherein is it determined where the storage unit is located using a function rule, which, when applied to the unknown temporary identifier, determines at which of the mobility nodes of the pool the storage unit is located, and transmitting the identification request to the determined storage unit.

2. The method according to claim 1, wherein the received message is a paging response message relating to a transaction in the cellular network terminating at said one mobile entity, and wherein the transmitting a reaction message comprising one or more of transmitting a request message to a subscriber database in which subscriber related information of the mobile entities of the cellular network are stored, the request message requesting a location update of said one mobile entity; and forwarding an enhancement of the received paging response message to another mobility node of the pool, wherein the enhancement comprises adding a temporarily assigned roaming number to the paging response message.

3. The method according to claim 1, wherein the received message is a connection request relating to a transaction in the cellular network originating from said one mobile entity, the transmitting a reaction message comprising transmitting a request message to a subscriber database in which subscriber related information of the mobile entities of the cellular network are stored, the request message requesting subscriber data of said one mobile entity based on the unique identifier of said one mobile entity.

4. The method according to claim 1, wherein the transmitted identification request comprises a request for an address of a mobility node configured to manage a mobility of the mobile entities in the cellular network, the received response furthermore comprising the requested address of the mobility node.

5. The method according to claim 1, wherein each mobility node of the pool of mobility nodes is configured to track a mobility of a plurality of mobile entities in the at least a section of a cellular network, and wherein the storage unit comprises a first storage unit and a second storage unit, wherein the first storage unit stores information allowing a temporary identifier to be determined based on a unique identifier unit and the second storage unit stores information allowing a unique identifier to be determined based on a temporary identifier.

6. The method according to claim 5, wherein each mobility node of the pool has a first storage unit stored on another mobility node of the pool and each mobility node has a second storage unit distributed among other mobility nodes of the pool.

7. The method according to claim 5, wherein one first storage unit and/or one second storage unit is/are provided for the pool of mobility nodes covering a defined region of the cellular network.

8. The method according to claim 6, wherein the first storage unit and the second storage unit contain a partial copy of a location register containing information about the mobile entities roaming within the common section served by the corresponding mobility nodes.

9. A mobility node configured to track a mobility of a plurality of mobile entities-in at least a section of a cellular network, in which a pool of mobility nodes serve a common section of the cellular network, wherein for each of the mobile entities a unique identifier is used in the cellular network to uniquely identify the corresponding mobile entity and a temporary identifier is used to identify the corresponding mobile entity in the at least one section of the cellular network, the mobility node comprising:

a processor and a memory, said memory including instructions executable by said processor whereby said processor is operative to:

receive a message for one of the mobile entities in which the mobile entity is identified by an unknown temporary identifier, wherein the processor is configured to receive the message via an interface, initiate a transmission, via the interface, of an identification request to a storage unit storing information allowing a unique identifier to be determined based on a temporary identifier, the identification request requesting the unique identifier for said one mobile entity to be identified based on the unknown temporary identifier, and receive a response to the transmitted identification request via the interface, the response comprising information allowing the unique identifier related to the received unknown temporary identifier to be determined, transmit, via the interface, a reaction message reacting to the received message taking into account the unique identifier related to the unknown temporary identifier, determine where the storage unit is located using a function rule, which, when applied to the unknown temporary identifier, determines at which of the mobility nodes of the pool the storage unit is located, and initiate a transmission of the identification request to the determined storage unit.

10. The mobility node according to claim 9, wherein the received message is a paging response message relating to a transaction in the cellular network terminating at said one mobile entity, and wherein transmitting the reaction message comprising one or more of
- a transmission, as the reaction message, of a request message to a subscriber database in which subscriber related information of the mobile entities of the cellular network are stored, the request message requesting a location update of said one mobile entity
- forwarding, as the reaction message, an enhancement of the received paging response message to another mobility node of the pool, wherein the enhancement comprises a temporarily assigned roaming number added to the paging response message.

11. The mobility node according to claim 9, wherein the received message is a connection request relating to a transaction in the cellular network originating from said one mobile entity, wherein the at least one processing unit is configured to initiate a transmission, as a reaction message, of a request message to a subscriber database in which subscriber related information of the mobile entities of the cellular network is stored, the request message requesting subscriber data of said one mobile entity based on the unique identifier of said one mobile entity.

12. The mobility node according to claim 9, wherein the interface is configured to receive update information, the update information containing at least one of a new temporary identifier for a unique identifier and an address of a mobility node configured to manage a mobility of the mobile entities in the cellular network.

13. The mobility node according to claim 9, wherein each mobility node of the pool of mobility nodes is configured to track a mobility of a plurality of mobile entities in the at least a section of a cellular network, and
wherein the storage unit comprises a first storage unit and a second storage unit, wherein the first storage unit stores information allowing a temporary identifier to be determined based on a unique identifier unit and the second storage unit stores information allowing a unique identifier to be determined based on a temporary identifier.

14. The mobility node of claim 13 wherein each mobility node of the pool has a first storage unit stored on another mobility node of the pool and each mobility node has a second storage unit distributed among other mobility nodes of the pool.

15. The mobility node of claim 13, wherein the first storage unit and the second storage unit contain a partial copy of a location register containing information about the mobile entities roaming within the common section served by the corresponding mobility nodes.

16. The mobility node of claim 13, wherein the first storage unit contains information allowing the TMSI to be identified based on an IMSI, and wherein the second storage unit contains information allowing the IMSI to be identified based on an TMSI.

* * * * *